United States Patent [19]

Velasco

[11] Patent Number: 5,032,845

[45] Date of Patent: Jul. 16, 1991

[54] VEHICLE LOCATING SYSTEM WITH LORAN-C

[75] Inventor: Robert Velasco, Tampa, Fla.

[73] Assignee: D.G.R., Inc., Brandon, Fla.

[21] Appl. No.: 477,080

[22] Filed: Feb. 8, 1990

[51] Int. Cl.$^5$ ................................................ G01S 3/02
[52] U.S. Cl. ...................................... 342/457; 342/389; 342/464
[58] Field of Search .................... 342/389, 457, 464

[56] References Cited

U.S. PATENT DOCUMENTS

| | | | |
|---|---|---|---|
| 3,471,856 | 10/1969 | Laughlin, Jr. et al. | 343/6 |
| 3,534,367 | 10/1970 | Laughlin et al. | 343/112 |
| 4,494,119 | 1/1985 | Wimbush | 342/357 |
| 4,651,156 | 3/1987 | Martinez | 342/457 |
| 4,651,157 | 3/1987 | Gray et al. | 342/457 |
| 4,739,335 | 4/1988 | Fourmaud et al. | 342/451 |
| 4,740,792 | 4/1988 | Sagey et al. | 342/457 |
| 4,742,357 | 5/1988 | Rackley | 342/457 |
| 4,743,913 | 5/1988 | Takai | 342/457 |
| 4,791,572 | 12/1988 | Green, III et al. | 364/449 |
| 4,818,998 | 4/1989 | Apsell et al. | 342/44 |
| 4,843,575 | 6/1989 | Crane | 364/550 |
| 4,845,504 | 7/1989 | Roberts et al. | 342/457 |

Primary Examiner—Theodore M. Blum
Attorney, Agent, or Firm—Lowe, Price, LeBlanc & Becker

[57] ABSTRACT

The location of a vehicle having an assigned serial number is determined at a location remote from the vehicle with a system including a central master station and plural local networks, each having a local master station in a bi-directional communication link with the central master station. Each vehicle includes a receiver for Loran-C emissions, a transmitter for modulating a first carrier having a frequency much higher than the Loran-C emissions with pulses having time positions corresponding with and synchronized with Loran-C pulses as the received Loran-C emissions, and a receiver for a second carrier having a frequency much higher than the Loran-C emissions. The first carrier is modulated by vehicle serial number signals. The carriers are transmitted via radio links between the local master station and vehicle. The local master station responds to the first carrier to detect the time difference between pulses modulating the first carrier to determine vehicle position. A data signal transmitted by the local master station to the central master station indicates the vehicle position and serial number. The central master station responds to the data signal to indicate vehicle location and serial number. The central master station transmits an information signal including a vehicle serial number to the local master stations. The central master station derives a voice signal that is converted to an aural signal at the vehicle with the designated serial number. The vehicle includes a receiver for a locally generated vehicle identification signal vehicle condition sensors. Activation of the transmitter on the vehicle is controlled in response to the receiver for the locally generated coded signal and the sensed vehicle conditions, and in response to the serial number signal originating at the central master station.

36 Claims, 13 Drawing Sheets

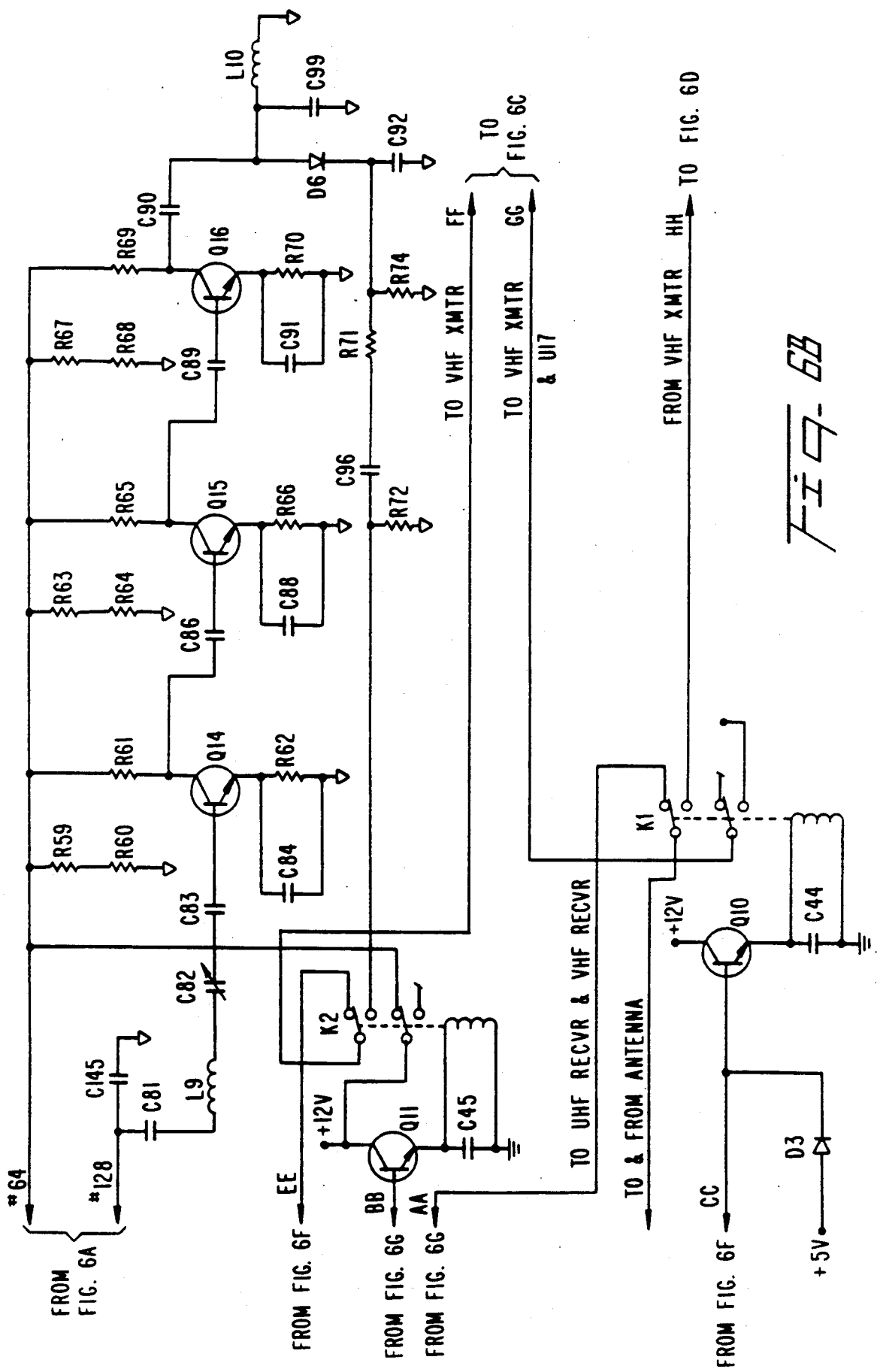

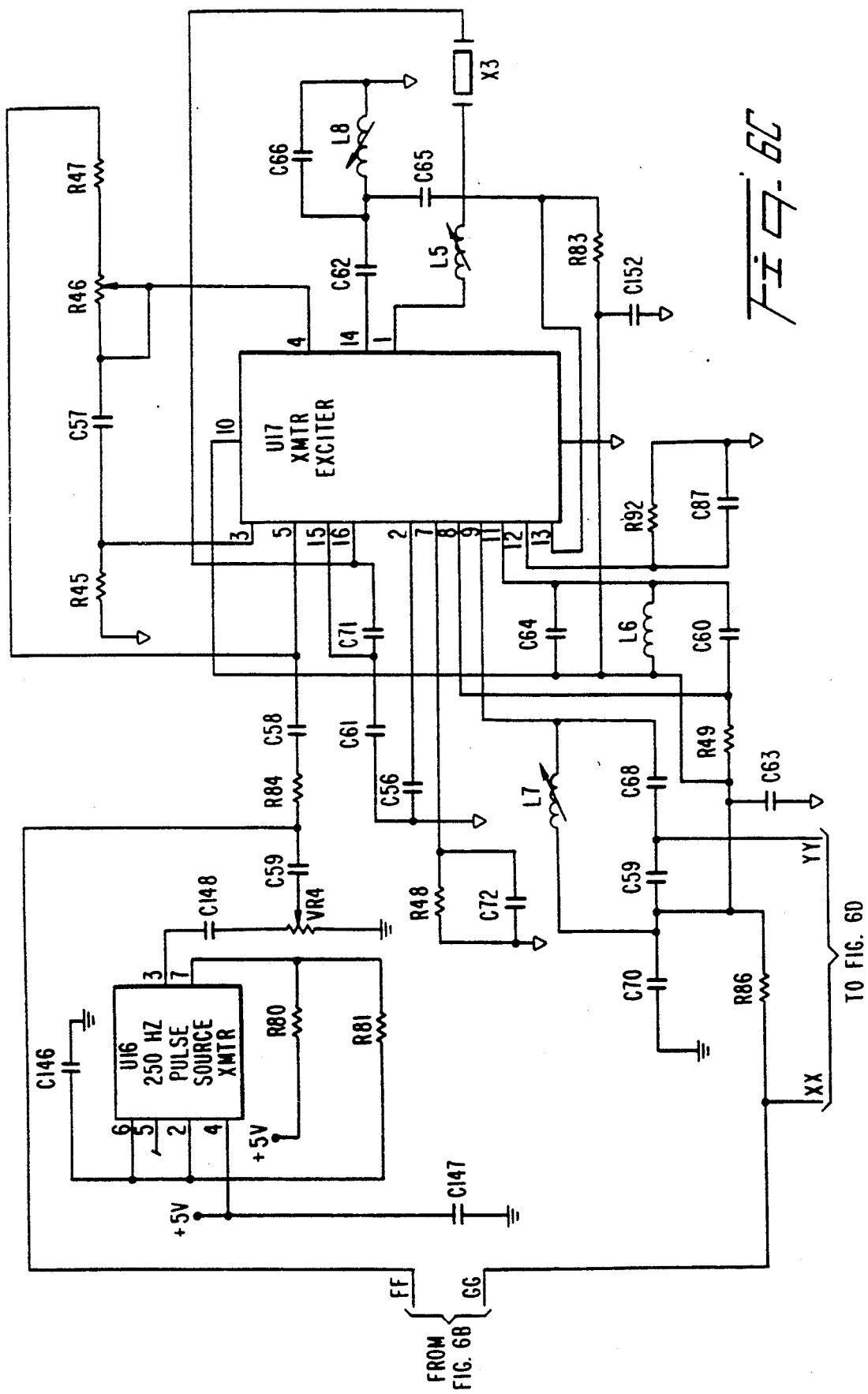

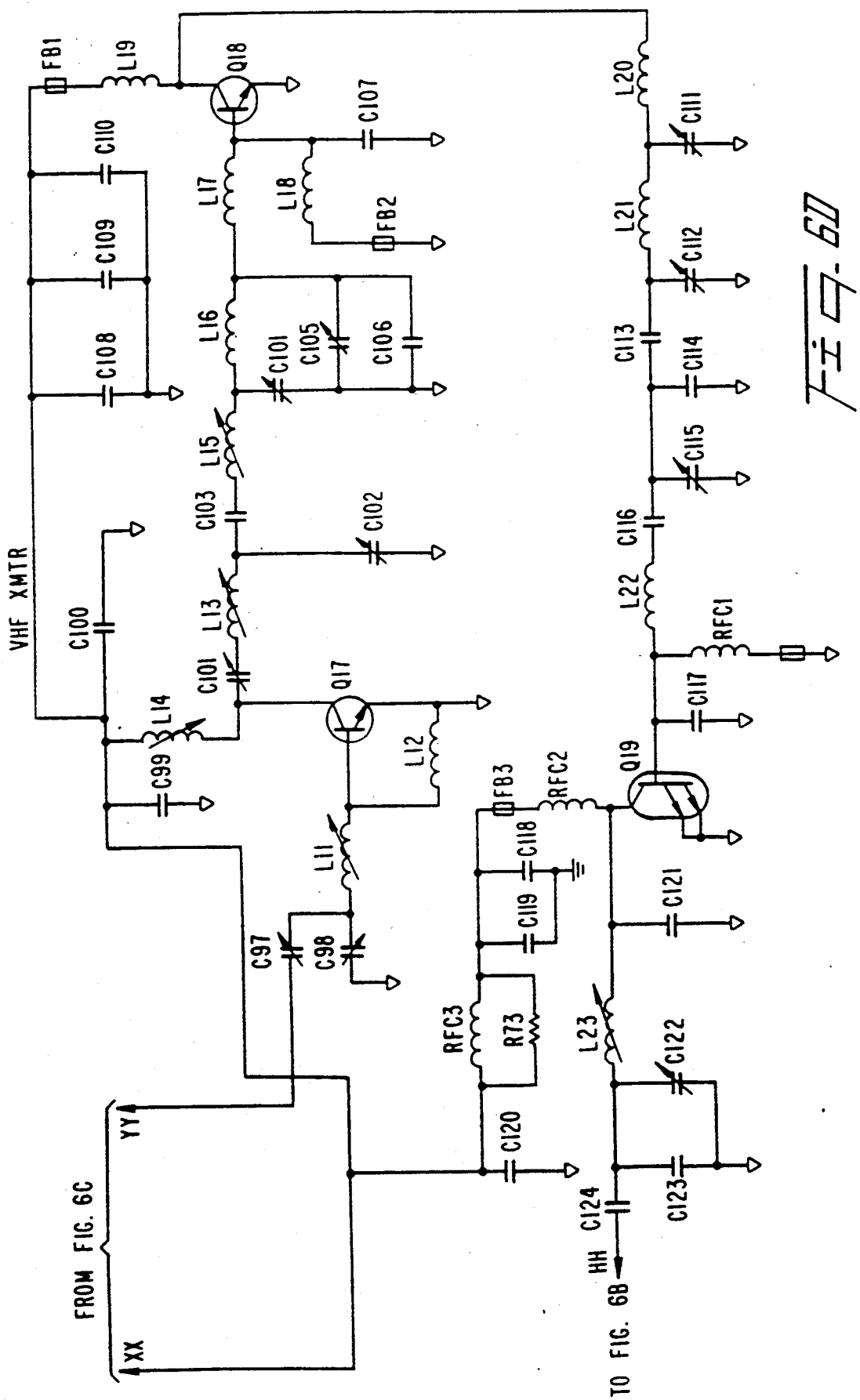

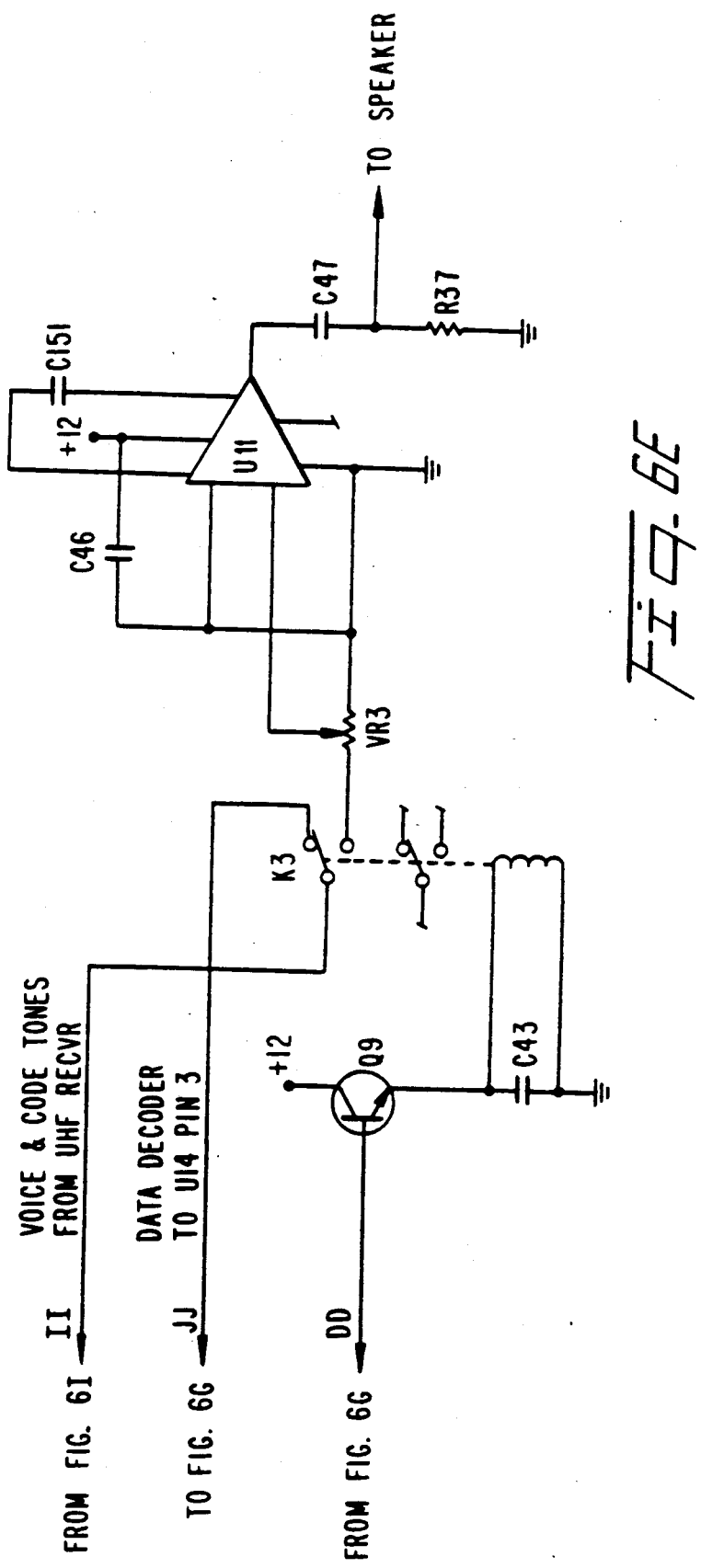

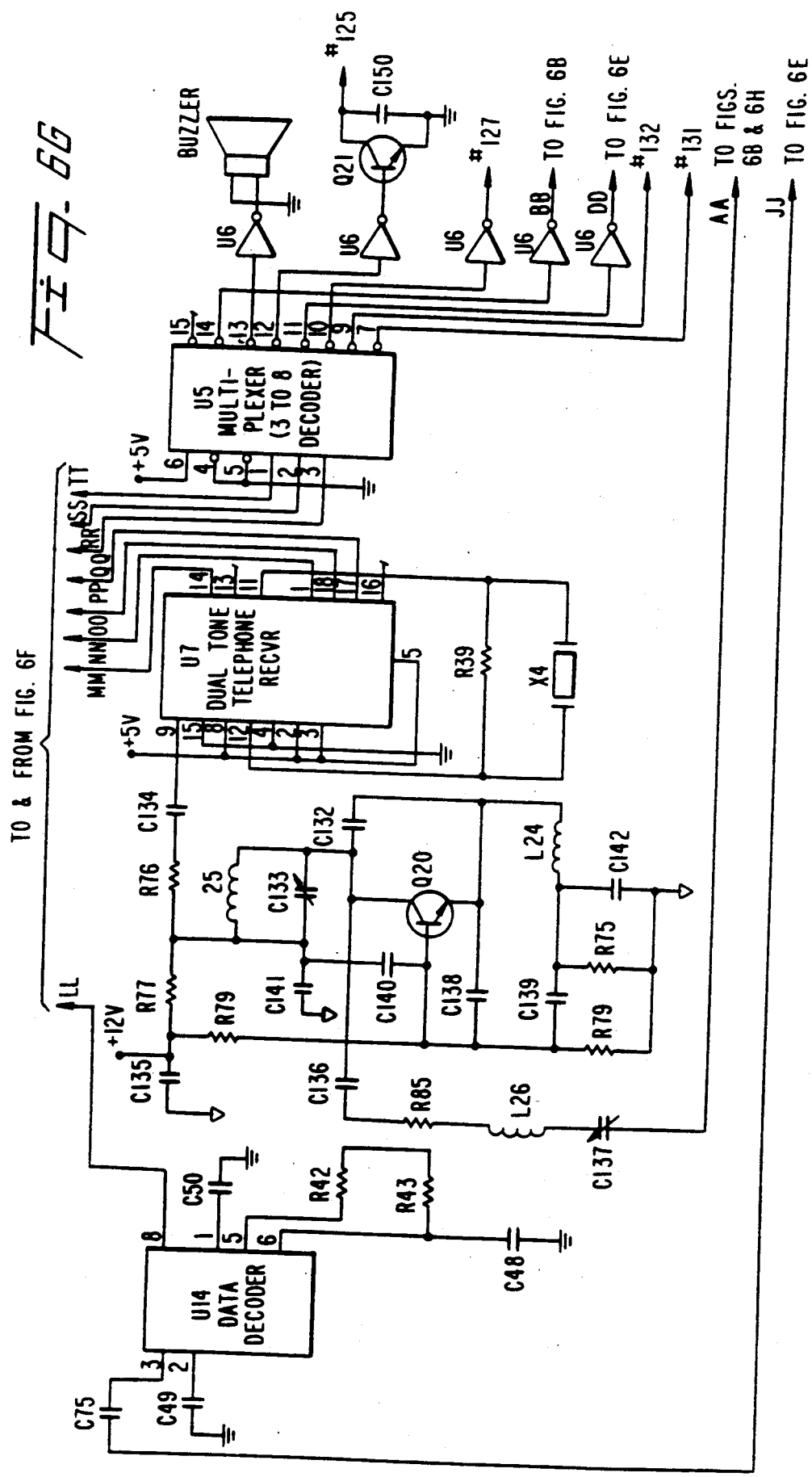

VEHICLE LOCATING SYSTEM WITH LORAN-C

FIELD OF THE INVENTION

The present invention relates generally to a system for and method of determining the location of a vehicle and more particularly to a system for and method of detecting vehicle location wherein each of plural vehicles derives a radio wave modulated by pulses having displaced time positions synchronized and corresponding with the reception times of Loran-C pulses at the vehicle.

BACKGROUND ART

The need to locate vehicles, such as automobiles and boats, has been recognized for years. Various systems have been developed to monitor vehicle position. Such systems can be used by owners of vehicle fleets, such as for automobile rental and trucks involved in long distance hauling. In addition such systems can be used for detecting the locations of vehicles used by unauthorized users, e.g., stolen vehicles.

Gray et al., U.S. Pat. No. 4,651,157 discloses a system wherein the locations of vehicles being protected from theft are responsive to Loran-C emissions. Each vehicle includes a Loran-C receiver and computes the time difference between receipt at the vehicle of the Loran-C pulses. The time difference signals are transmitted from the vehicle to a central station, where computation of vehicle longitude and latitude is performed. Computing the time difference on board the vehicle is quite expensive because of the need for high frequency microprocessors and very stable clock sources. If relatively low frequency microprocessors and conventional clock sources are employed, the required accuracy of the time difference signals derived at each vehicle is not adequate to determine the location of the vehicle with a high degree of accuracy.

It is, accordingly, an object of the present invention to provide a new and improved apparatus for and method of determining the position of a vehicle having a radio receiver for low frequency electromagnetic waves, such as those derived from at least three Loran-C transmitters.

Another object of the invention is to provide a new and improved relatively inexpensive system for and method of determining the position and identity of a vehicle being used by an unauthorized user.

Another object of the invention is to provide a new and improved system for and method of determining the position of an unauthorized vehicle wherein pulses that are synchronized and correspond with received emissions from Loran-C transmitters modulate a radio wave derived on the vehicle.

Another object of the invention is to provide a new and improved system for and method of determining the position of a vehicle in response to a command signal for the vehicle identity initiated at a central master station.

DISCLOSURE OF THE INVENTION

In accordance with one aspect of the invention, the location of a vehicle equipped with a receiver for low frequency, preferably Loran-C, radio waves, comprises transmitting first pulses of the low frequency radio wave from three stations having known positions to the vehicle. The first pulses are transmitted from the stations at precise time intervals so that the pulses from the different stations arrive at the vehicle at displaced times; this operation is typical of a Loran-C system. The first pulses of the low frequency radio waves are received at the receiver on the vehicle. A radio frequency wave modulated by second pulses is transmitted from the vehicle. The second pulses have displaced time positions synchronized and corresponding with the reception times of the first pulses as received by the receiver. The radio frequency wave is received at a fixed location displaced from the vehicle. The displaced time positions of the second pulses are detected in response to the radio frequency wave received at the location displaced from the vehicle. The location of the vehicle is determined from the detected displaced time positions.

The method is performed for a fleet of vehicles, each including one of the receivers. Each of the receivers has a different digital code assigned to it. A communication link is established between a local master station and each of the receivers. One of the receivers is selected by transmitting the code associated with the receiver via the link and then transmitting the radio frequency wave from the selected receiver to the local master station via the link.

A plurality of the local master stations are provided at displaced locations. The plural local master stations communicate with a central master station. The displaced time positions and calculation of the vehicle location are made at each of the local master stations. Calculating the vehicle location at the local master stations, rather than at the central master station, has several advantages. In particular, a relatively low bandwidth communication link, such as a telephone link, can be used between the local and central master stations. In addition, it is easier to calculate vehicle position at the local master station because the local master station need only store the locations of the Loran-C transmitters closest to it. There is no need for the central master station to keep track of the transmitting local master station if the local master station calculates vehicle position.

The digital serial number code for a vehicle to be located is transmitted from the central station to the local master stations. The central master station can also transmit other messages to the identified vehicle, such as a voice signal that is transduced on the vehicle into an aural message to an unauthorized user of the vehicle. Such an aural signal may cause the unauthorized user to abandon the vehicle.

According to another feature of the invention, the receiver on the vehicle includes a section responsive to another wave radiated from a source carried by an authorized vehicle operator. The another wave has a pre-assigned code modulated thereon, which code identifies the holder of the another wave source as an authorized user of the vehicle. In response to the pre-assigned code of the received another wave being the same as a predetermined digital code at the receiver, the receiver is activated into a first state for a predetermined time interval. The receiver is normally in a second state at alternate times. Transmission of the radio frequency wave including the vehicle serial number code and replicas of the received Loran-C pulses from the vehicle is prevented during the predetermined interval.

In accordance with another aspect of the invention, a condition of the vehicle is detected. Transmission of the radio frequency wave from the vehicle is controlled in response to the detected vehicle condition and the code of the received another wave.

It is a further object of the present invention to provide a new and improved apparatus adapted to be mounted on a vehicle to be responsive to a sensed vehicle condition and a wave having a predetermined code for selectively transmitting a radio wave having modulated thereon a signal indicative of the identification of the vehicle and pulses having time positions synchronized and corresponding with Loran-C pulses received at the vehicle.

Still another object of the invention is to provide a new and improved security system for a vehicle wherein an indication of vehicle position is transmitted to a remote location in response to a sensor on the vehicle being activated and a coded signal that is normally derived by an authorized user of the vehicle not being received by the vehicle.

Still another object of the invention is to provide a local master station in a system for determining the location of a vehicle responsive to Loran-C emissions.

Another object of the invention is to provide a local master station used in a system for determining the position of a vehicle, wherein the local master station transmits data to a central master station that need not keep track of the identity of the local master station which transmits signals to it.

Another object of the invention is to provide a local master station that can communicate via a relatively low bandwidth communication link with a central master station, wherein the local master station is responsive to pulses that are synchronized and correspond with Loran-C pulses received by a vehicle in a communication link with the local and central master stations.

While there has been described and illustrated one specific embodiment of the invention, it will be clear that variations in the details of the embodiment specifically illustrated and described may be made without departing from the true spirit and scope of the invention as defined in the appended claims.

DETAILED DESCRIPTION OF THE DRAWING

Figure 1:
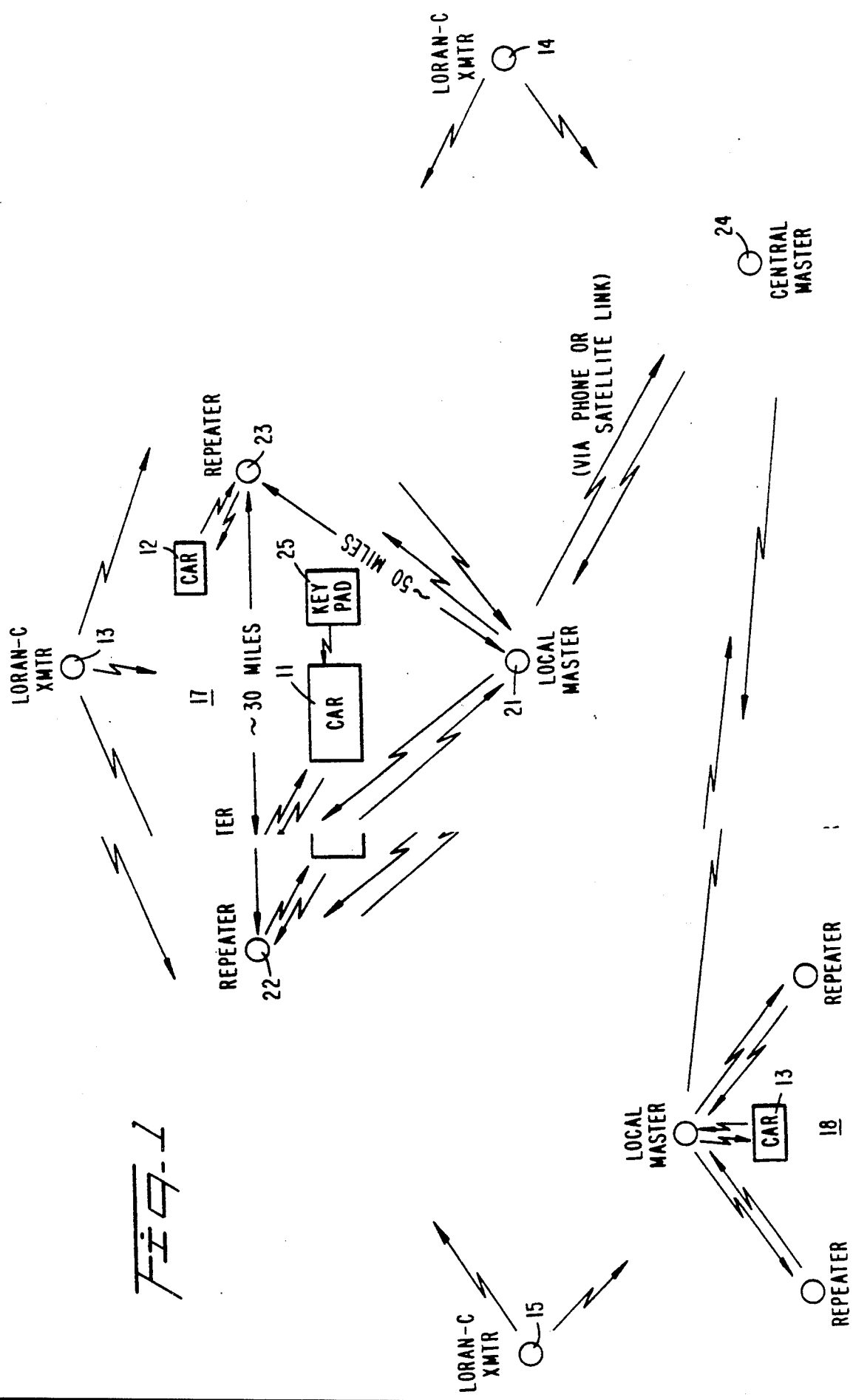
FIG. 1 is a block diagram of a system for determining the position of several automotive vehicles in disparate locations utilizing the principles of the present invention.

Reference is now made to FIG. 1 of the drawing wherein there is illustrated a system for locating the position of automotive vehicles 11, 12 and 13 equipped with the apparatus of the present invention. Automotive vehicles 11 and 12 are in relatively close proximity with each other, while vehicle 13 is somewhat remote from vehicles 11 and 12. All of vehicles 11-13 are sufficiently close to fixed Loran-C transmitters 14, 15 and 16 to receive the low frequency (approximately 100 kHz) radio waves derived from the transmitters. Loran-C transmitters 13-15 are part of an existing Loran-C network that covers virtually the entire land mass of the United States. The low frequency radio waves derived from transmitters 13-15 are modulated by relatively short duration pulses. The pulses are generated by transmitters 13-15 at times such that the pulses invariably are received at different times by all of the vehicles in the region covered by transmitters 13-15. In most regions of the United States, Loran-C transmitters 13-15 are spaced from each other by approximately 400 miles.

Figure 2:
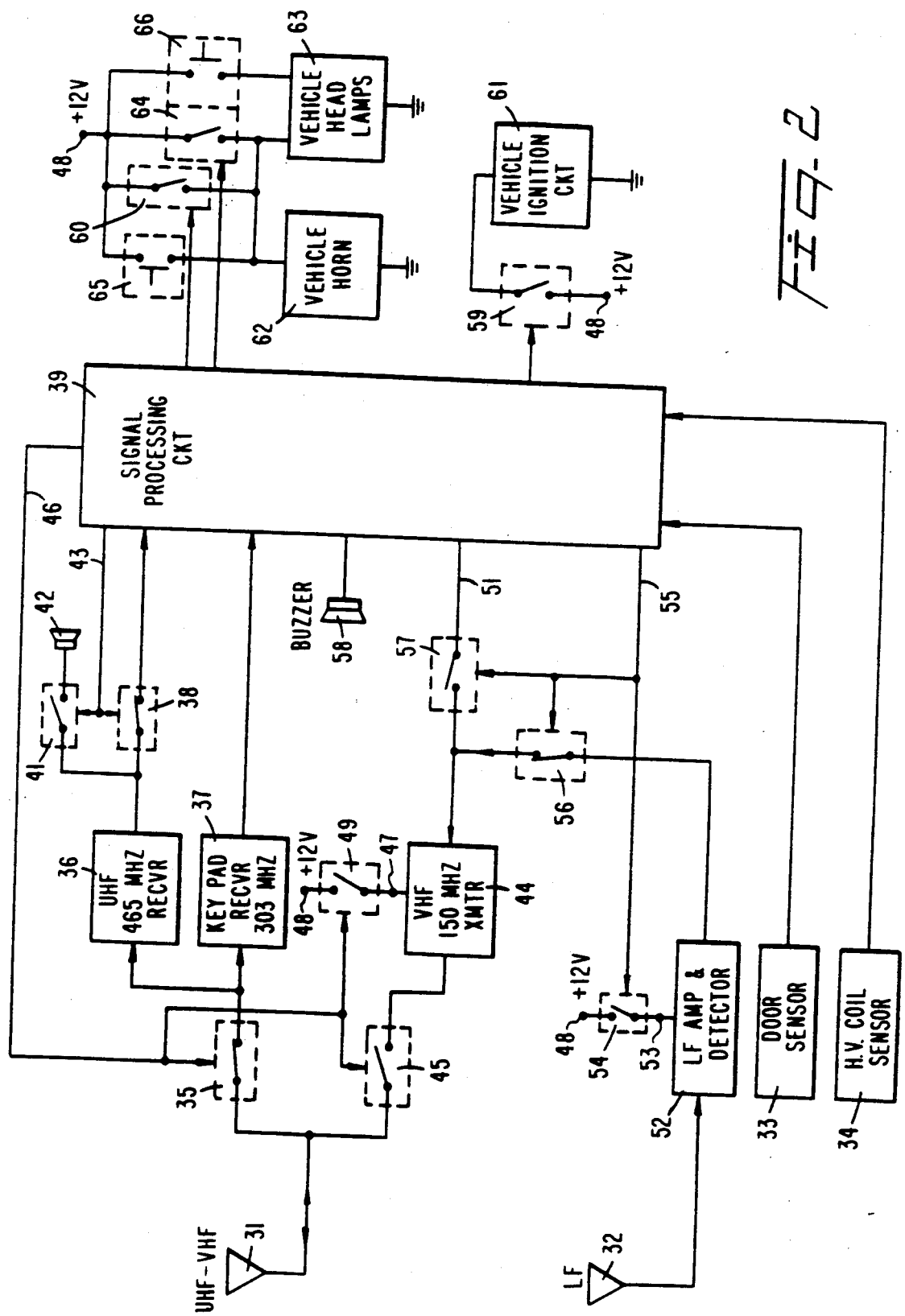
FIG. 2 is a block diagram of circuitry included in an automotive vehicle equipped with the present invention.

In the region covered by radiation from transmitters 13-15 are several local VHF-UHF transmission networks, forming part of the present invention. In FIG. 2, only two such local transmission networks 17 and 18 are illustrated. Automotive vehicles 11 and 12 are located in the transmission region of network 17, while automotive vehicle 13 is located in the region of network 18. Networks 17 and 18 are essentially the same, so that a description of network 17 suffices for network 18, as well as all of the remaining local networks of the system.

Local network 17 includes fixed local master station 21 and fixed repeater stations 22 and 23. Typically, repeaters 22 and 23 are spaced approximately 50 miles from local master station 21 and approximately 30 miles from each other. The exact spacing between stations 21-23 is a function of terrain and intervening structures. Full duplex VHF and UHF links, preferably at 150 mHz and 465 mHz, respectively, subsist between local master station 21 and each of repeaters 22 and 23. A phone or microwave satellite link subsists between local master station 21 and fixed central master station 24, as well as between the local master station of local network 18 and the central master station.

In the fully completed network, many different local networks, such as networks 17 and 18, are provided at different locations throughout the United States. The local networks are responsive to Loran-C transmitters throughout the United States. The local master station in each local network is coupled via a phone or satellite link to central master station 24.

Vehicle 11 includes equipment for establishing radio wave links at VHF and UHF to repeater 22. Vehicle 11 includes a VHF transmitter, at 150 mHz, for supplying radio waves to repeater 22, which in turn relays the 150 mHz signal to local master station 21. Vehicle 11 also includes a UHF receiver at 465 mHz, responsive to voice and data modulation originating at central master station 24 and coupled to vehicle 11 by way of local master station 21 and repeater 22 via the UHF link at 465 mHz. Vehicle 11 also includes a low frequency receiver responsive to the pulses modulated on the low frequency radio waves emitted by Loran-C transmitters 13-15.

To provide a security function for automotive vehicle 11, an authorized driver of the vehicle is provided with key pad 25, including an inductive transmitter having a range of approximately 200 feet. The inductive transmitter emits a carrier frequency of approximately 303 mHz that is modulated by two audio frequency tones in response to activation of keys on the key pad. The modulation frequencies imposed on the 303 mHz inductive wave derive from key pad 25 correspond with dual frequencies generated by a telephone keyboard.

Vehicle 11 also includes conventional sensors for determining when a door of the vehicle is open and when the vehicle motor is operating. Vehicle motor operation is monitored by sensing the current flowing in the high voltage coil of the vehicle engine, while door opening is sensed by the same circuitry which is used to control activation of interior lamps of the vehicle.

Every automotive vehicle whose position is susceptible of being detected with the present invention is assigned a different serial number; typically, each serial number is represented by eight hexadecimal bytes. In addition, each vehicle in a particular region is provided with a different four-digit code, associated with a particular code sequence derived from key pads 25 of authorized users. Activation of the correct sequence of numbers from key pads 25 causes circuitry in vehicle 11 to be deactivated so that in response to movement of the vehicle, no transmission occurs from the vehicle to repeater 22, thence local master station 21 and to central master station 24.

If, however, vehicle 11 is started without the correct number sequence from key pad 25 being produced, a transmission link is established from vehicle 11 to local master station 21. The signal transmitted from vehicle 11 to local master station 21 via repeater 22 includes an indication of the vehicle serial number, as expressed by the eight-byte hexadecimal signal. In addition, the Loran-C pulses received by vehicle 11 from transmitters 13–15 are detected and converted into pulses which modulate the VHF link from vehicle 11 to local master station 21 via repeater 22. The pulses modulating the VHF carrier transmitted from vehicle 11 to local master station 21 have displaced time positions synchronized and corresponding with the reception times of the pulses from Loran-C transmitters 13–15 at vehicle 11.

At local master station 21 the relative arrival times of the Loran-C pulses are calculated. In response to the calculated Loran-C pulse arrival times, station 21 derives digital signals representing the position of vehicle 11, in longitude and latitude, to a fraction of a second. These digital signals, together with digital signals representing the serial number of vehicle 11 are transmitted via the phone or satellite link from local master station 21 to central master station 24.

There are several advantages in calculating the position of vehicle 11 at local master station 21, rather than in the vehicle or at central master station 24. Determining the relative time positions of the Loran-C pulses from transmitters 13–15 on vehicle 11 is disadvantageous because of the requirement for a relatively expensive, high speed microprocessor and a precise clock source. Conventional low frequency microprocessors and relatively low stability crystal oscillators can be employed in vehicles 11–13 if the vehicles only detect the presence of pulses from transmitters 13–15 and modulate a carrier with pulses that are synchronized and correspond with the received pulses so that pulses transmitted from the vehicles have the same relative occurrence times as the pulses the vehicles receive from the Loran-C transmitters. Typically, the conventional relatively low frequency microprocessors and conventional low stability oscillators have a cost factor of about one-tenth that of high frequency microprocessors and high resolution clock sources. In a system including at least tens of thousands of automotive vehicles, the cost saving through such a technique is appreciable.

Calculating the time differences and the longitude and latitude of the automotive vehicles at the local master station of each local network, rather than at central master station 24, enables a relatively low bandwidth link to be included between the local master stations and central master station 24. Typical, wire-based telephone links do not have sufficiently high bandwidth to maintain the required time resolution for the Loran-C pulses received by automotive vehicle 11 from transmitters 13–15 and relayed from the vehicle to local master station 21 via repeater 22. In addition, calculating the coordinate positions of automotive vehicle 11 at local master station 21 avoids the need for a real time link for replicas of the Loran-C pulses received by vehicle 11 from local master station 21 to central master station 24. Real time links between the local master stations and central master station 24 are frequently to be avoided so that the central master station can control the transmission of signals to and from it.

A further advantage of calculating vehicle position at the local master station, rather than at central master station 24, is that there is no need to transmit the identity of the local master station to the central master station to determine vehicle location. The local master station stores signals indicative of the known positions of the fixed Loran-C transmitters that are closest to it and to which the vehicle supplying signals to the local master station is responsive. Therefore, the calculations for the vehicle position are more easily performed at each local master station than at central master station 24.

In certain situations, it is desired for central master station 24 to determine the position of a certain vehicle, such as vehicle 11, independently of signals from key pad unit 25 or other sensors, such as a door opening sensor or a high voltage coil sensor on the vehicle. For example, owners of automobile rental or truck fleets, need to locate their vehicles. In such an instance, central master station 24 transmits a signal to all of the local master stations. The thus transmitted signal includes the eight-byte hexadecimal serial number code for the vehicle to be located. The signal transmitted from central master station 24 is received by all of the local master stations. The vehicle identification signal is relayed from each local master station to the repeaters of the local network which are coupled to the local master station. The repeaters and the local master station couple the signal, at UHF, to all automotive vehicles in the particular region covered by the particular local network. The vehicle having the same serial number code as the vehicle serial number code derived and transmitted from central master station 24 is thereby activated to relay replicas of the Loran-C pulses of transmitters 13–15 as received by that vehicle. The Loran-C signals, as received on vehicle 11 modulate the VHF signal transmitted from vehicle 11, as does the vehicle identification serial number code for the vehicle. The VHF signal is transmitted from vehicle 11 via repeater 22 to local master station 21, where the longitude and latitude of vehicle 11 are calculated. In response to an interrogation from central master station 24, the vehicle identification code and longitude and latitude of vehicle 11 are transmitted from local master station 21 to central master station 24.

At local master station 21 is a receiver for the UHF signal supplied to it via repeaters 22 and 23 or the UHF signal transmitted directly to the local master station from vehicle 11. The receiver at local master station 21 includes circuitry, similar to that employed in a conventional Loran-C receiver, for determining the time separation between adjacent pairs of pulses which correspond with the Loran-C pulses received on vehicle 11. The detected time separations between the replicas of the Loran-C pulses received at local master station 21 are supplied to a conventional position determining computer which derives digital signals representing the longitude and latitude of vehicle 11. The digital signals representing the longitude and latitude of vehicle 11 modulate a signal transmitted from local master station 21 to central master station 24, as does a digital signal corresponding with the identification code for vehicle 11.

At central master station 24 the signal from local master station 21 is detected and supplied to a display or printout, to indicate the location of vehicle 11, as well as the numerical value for the coded serial number identification of the vehicle.

A block diagram of the equipment included in each of the vehicles is illustrated in FIG. 2 as including UHF-VHF antenna 31, low frequency antenna 32, door sensor 33, and high voltage coil sensor 34. Sensors 33 and 34 respectively derive binary one levels in response to the vehicle door being open and in response to operation of the vehicle engine. At all other times, sensors 33 and 34 derive binary zero, i.e., ground levels. Antenna 31 establishes the UHF-VHF link between vehicle 11 and the nearest repeater or local master station; in the system illustrated in FIG. 1, wherein the apparatus illustrated in FIG. 2 is mounted on vehicle 11, antenna 31 is in a communication link with repeater 22. Low frequency antenna 32 is responsive to low frequency Loran-C emissions from the three nearest Loran-C transmitters. In the system illustrated in FIG. 1, antenna 32 is responsive to the Loran-C emissions from transmitters 13-15.

Antenna 21 is also responsive to a 303 megaHertz inductive wave derived from key pad 25, on which numeric indicating dual tones are modulated. The UHF waves transduced by antenna 31 are coupled through normally closed contacts 35 in parallel to UHF receiver 36 and key pad receiver 37, respectively designed to be responsive to electric waves having frequencies of 465 megahertz and 303 megahertz. Receiver 36 derives an audio frequency representing either binary data derived from central master station 24 or a voice signal derived from the central master station. The data signal is coupled through normally closed contacts 38 to an input of signal processing circuit 39, while the voice signal is selectively coupled through normally open contacts 41 to loudspeaker 42. Contacts 38 and 41 are open and closed at mutually exclusive times in response to a signal derived by signal processing circuit 39 on lead 43.

Key pad receiver 37 responds to audio frequency tones modulated on the 303 megaHertz carrier to supply signal processing circuit 39 with signals representing the activated keys of key pad 25. Processing circuit 39 responds to the output signals of receiver 37 to determine if the numeric sequence supplied to the keys of key pad 25 corresponds with the numeric sequence associated with vehicle 11. The numeric sequence for vehicle 11 responsive to activation of key pad 25 contains considerably fewer digits than the vehicle serial number identification code that is transmitted via the VHF link between vehicle 11 and master station 24. The vehicle horn and headlamps can also be turned on and off from the key pad 25 in response to the operator of the key pad keying in the four digit vehicle identification code, followed by two or more key activations associated with different functions.

Signal processing circuit 39 responds to the output signal of key pad receiver 37, as well as to signals from door sensor 33 and high voltage coil sensor 34 to derive control signals for the various switch contacts illustrated in FIG. 2. Circuit 39 also responds to coded signals fed to it by receiver 36 via switch 38 to provide control signals for the various contacts.

The VHF link between vehicle 11 and local master station 21 is established by VHF transmitter 44, having an output frequency of 150 megahertz. The output of transmitter 44 is coupled to antenna 31 via normally open contacts 45. Contacts 35 and 45 are responsive to an output signal of processing circuit 39 on lead 46 so that contacts 35 and 45 are open and closed at mutually exclusive times. To minimize the power requirements of the circuit, power supply terminal 47 of transmitter 44 is normally decoupled from the vehicle plus 12 volt power supply terminal 48 by normally open contacts 49. Contacts 49 are open and closed in synchronism with opening and closing of contacts 45 in response to the signal on lead 46.

VHF transmitter 44 is selectively responsive, at different times, to binary data output signals of signal processing circuit 39, on lead 51 and to detected Loran-C pulses derived from low frequency amplifier and detector 52, having an input connected to low frequency antenna 32. Pulses are derived by low frequency amplifier and detector 52 in synchronism with the Loran-C pulses supplied to antenna 32 by emissions from Loran-C transmitters 13-15. Low frequency amplifier and detector 52 includes power supply terminal 53 normally connected to the +12 volt power supply terminal 48 via normally closed contacts 54. Contacts 54 are responsive to an output signal of signal processing circuit 39 on lead 55. The signal on lead 55 also controls opening and closing of normally closed contacts 56 and normally open contacts 57. Contacts 56 are connected between the output of low frequency amplifier and detector 52 and the input of VHF transmitter 44; contacts 57, when closed, supply the data output of signal processing circuit 39 on lead 51 to the input of transmitter 44. Contacts 56 and 57 are open and closed at mutually exclusive times in response to the signal on lead 55, such that contacts 54 and 56 are closed to supply replicas of the received Loran-C pulses to the input of transmitter 44 while the data signal on lead 51 is decoupled from the input of the VHF transmitter. When binary data signals are derived from processing circuit 39 on lead 51, contacts 54 and 56 are open circuited while contacts 57 are closed so that the VHF transmitter 44 is responsive only to the data signals.

Buzzer 58, which derives an audio frequency tone when supplied with a voltage, is connected to an output of signal processing circuit 39. Signal processing circuit 39 responds to the output signal of key pad receiver 37 and door sensor 33 to supply buzzer 58 with pulses if the door of the vehicle is open, as sensed by sensor 33, without the four digit vehicle code being derived from key pad 25. The pulses are supplied to buzzer 58 by circuit 39 for several seconds, as a reminder to an authorized user of the vehicle to enter the four digit vehicle code into key pad 25.

Signals from door sensors 33 and key pad receiver 37 are combined in signal processing circuit 39 to selectively close normally open contacts 59, in series with the vehicle 12 volt supply terminal 48 and vehicle ignition circuit 61. Normally closed contacts 59 are closed only in response to the four digit vehicle code being correctly received by receiver 37.

To provide visual and aural indications that the vehicle is being used by an unauthorized user, the vehicle horn 62 and headlamps 63 are energized in response to an output signal of signal processing circuit 39. The output signal of circuit 39 is applied to normally open contacts 60 and 64, respectively connected to vehicle horn 62 and headlamps 63. In response to a combination of inputs to signal processing circuit 39 from receiver 36, one or both of contacts 60 and 64 are closed to cause the vehicle horn to be sounded and/or the vehicle headlamps to be flashed on and off. Horn 62 and headlamp 63 are selectively activated in the normal manner in response to manual closing of switches 65 and 66, respectively connected between terminal 48 and horn 62 and headlamp 63, respectively.

Signal processing circuit 39 includes a microprocessor having an electronically programmable read only memory (EPROM). The microprocessor is preferably a relatively low frequency, inexpensive microprocessor such as an IN 8031 driven at a relatively low frequency by a conventional, relatively low stability crystal oscillator.

The microprocessor of signal processing circuit 39 is programmed so that the system is, under normal conditions, in an idle or armed state. In the idle or armed state, the system waits for a signal from door sensor 33 and/or signals from UHF receiver 36 and key pad receiver 37.

The program of the signal processing circuit switches from the idle or armed state to an active state in response to door sensor 33 deriving a binary one signal. In response to the binary one signal from door sensor 33, circuit 39 supplies pulses to buzzer 58 for a few seconds, to remind the person who is in the vehicle to enter the four digit vehicle identification code into key pad 25. In response to the correct code being entered into key pad 25 and being detected by receiver 37 within 30 seconds of the binary one level being derived by door sensor 33, circuit 39 supplies a binary one signal to contacts 59 for two minutes so that vehicle ignition circuit 61 is enabled for two minutes.

During this two minute interval, circuit 39 monitors the output of high voltage coil sensor 34 to determine if the vehicle engine is running. If the engine is not running, or is not turned on within one minute of contacts 59 being closed, the program returns to the idle or armed state. This typically signifies that the door sensor was activated in response to a vehicle occupant leaving the vehicle such that no one is in the vehicle to drive it. If the engine is turned on during the two minute interval after contacts 59 were closed, the state of the program in the microprocessor is frozen until a binary zero value is derived from high voltage coil sensor 34 or a message is supplied to circuit 39 by receiver 36. If a data signal is supplied by receiver 36 to signal processing circuit 39 under these circumstances, the data signal can command operation of the various outputs of signal processing circuit 39. In particular, the data signal may cause contacts 60 and 64 to be sequentially closed and open, to signal that the vehicle is being used by an unauthorized person, as can easily be detected since the vehicle horn 62 and headlamps 63 are sequentially activated to on and off states.

If, however, no signals are supplied to circuit 39 by receiver 37 while the engine is running, the program does not advance to another state until a binary one to zero transition of high voltage coil sensor 34 is detected by circuit 39. The program in signal processing circuit 39 returns to the idle or armed state one minute after detection of the transition thereby.

If the correct four digit code is not received by key pad receiver 37 and supplied to signal processing circuit 39 within 30 seconds after a zero to one binary transition is derived by door sensor 33, signal processing circuit 39 maintains contacts 59 in an open circuit condition, so that power cannot be supplied to vehicle ignition circuit 61 by the voltage at terminal 48. Simultaneously, circuit 39 supplies a binary one level to lead 46, causing contacts 45 and 49 to be closed, while contacts 35 are open. At this time, circuit 39 also supplies a binary one level to lead 55, causing contacts 57 to close, while contacts 54 and 56 are open.

In response to these conditions being established, the program in circuit 39 causes the eight byte vehicle serial number signal to be supplied to transmitter 44 via lead 51 and contact 57. The eight byte serial number signal modulates transmitter 44, causing a 150 mHz signal to be supplied by the transmitter via contacts 45 to antenna 31. The 150 mHz signal modulated by the serial number is transmitted from antenna 31 to repeater 22, thence to local master station 21, thence to central master station 24. After the serial number signal has been transmitted, signal processing circuit 39 supplies a binary zero level to lead 46, causing contacts 35 to return to the normally closed position thereof, while contacts 45 and 49 return to the normally open position thereof. Contacts 35, 45 and 49 remain in this state for approximately two minutes, while receiver 36 and circuit 39 wait for a response from central master station 24. Simultaneously, binary one and zero levels are applied by circuit 39 to contact 64, causing repeated, sequential on and off operation of vehicle horn 62 and headlamp 63.

If no response is received from central master station 24 by receiver 36 during the two minute interval, a binary one level is again applied by circuit 39 to lead 46 and the central processing station again supplies the eight byte vehicle serial number signal to transmitter 44. This operation is repeated over and over again, on a two minute basis, until a coded vehicle serial number signal is detected by circuit 39 after having been received by receiver 36 from central master station 24.

The signal supplied by receiver 36 to signal processing circuit 39 via contacts 38 signals to the processing circuit that the central master station is aware of the vehicle being used by an unauthorized user and that the central master station is ready to track the vehicle position. Circuit 39 responds to such a coded signal by supplying a binary zero level to lead 55, so that power is supplied by contacts 54 to power supply terminal 53 of low frequency amplifier and detector 52, while connecting the output of the low frequency amplifier and detector to the input of VHF transmitter 44. Simultaneously, a binary one level is applied by circuit 39 to lead 46, causing power to be supplied via contacts 49 to transmitter 44, while coupling the output of the transmitter to antenna 31. Under these conditions, replicas of Loran-C pulses detected by amplifier and detector 52 are supplied for several seconds to transmitter 44 where they modulate the 150 mHz carrier derived by the transmitter.

After the several seconds have elapsed, processing circuit 39 supplies a binary zero level to lead 46, causing UHF receiver 46 again to be connected to antenna 31, while decoupling transmitter 44 from the antenna. If a coded signal is not supplied by antenna 31 to receiver 36 indicating that central master station 24 has received the Loran-C pulses within three minutes of completion of the transmission of the replicas of the Loran-C pulses from transmitter 44, signal processing circuit 39 again supplies a binary one level to lead 46. Replicas of the Loran-C pulses are again coupled by transmitter 44 to antenna 31.

Operation continues in this manner until receiver 36 supplies signal processing circuit 39 with a signal acknowledging receipt by central master station 24 of the longitude and latitude information and the vehicle serial number for vehicle 11. In response to such a coded signal being supplied by receiver 36 to processing circuit 39, the unit goes into a "passive" state. In the passive state, circuit 39 supplies binary zero levels to leads 46 and 55. In the passive state, several different messages can be transmitted from central master station 24 to vehicle 11. In addition, signals can be transmitted from key pad 25 to receiver 37. The signals received by receivers 36 and 37 during this time cause signal processing circuit 39 to perform various functions, such as activating vehicle headlamps 63 and vehicle horn 62.

Several different messages can be transmitted from master station 24 to vehicle 11 under these conditions. For example, a voice signal originating at central master station 24 can be supplied to speaker 42 for a predetermined time interval. Such operation is performed by central master station 24 supplying a predetermined coded signal to circuit 39 by way of receiver 36. The coded signal causes circuit 39 to supply a binary one level to lead 43, causing contacts 41 to close, so that speaker 42 responds to the voice output signal of receiver 36. During the predetermined interval, a voice message can be transmitted from station 25 to vehicle 31, to advise the unauthorized vehicle driver that his location is exactly known; for example, the message could consist of "The police have been advised of your unauthorized use of this (make and model of vehicle) and that the vehicle is approximately at the intersection of Main and Commerce Streets." After the predetermined time interval has elapsed, circuit 39 supplies a binary zero level to lead 43 and awaits additional commands from receiver 36 or key pad 25. One of the signals from central master station 24 activates circuit 39 so that a binary one level is applied to lead 46 while a binary zero level is applied to lead 55. Under these conditions, the position of vehicle 11 is ascertained in response to replicas of the Loran-C pulses coupled by detector 52 to transmitter 44, thence to local master station 21, with a further communication of the vehicle code and vehicle location to central master station 24. Before circuit 39 connects detector 52 with transmitter 44, the vehicle serial number eight byte signal is transmitted by supplying binary one levels to leads 46 and 55.

Figure 3:
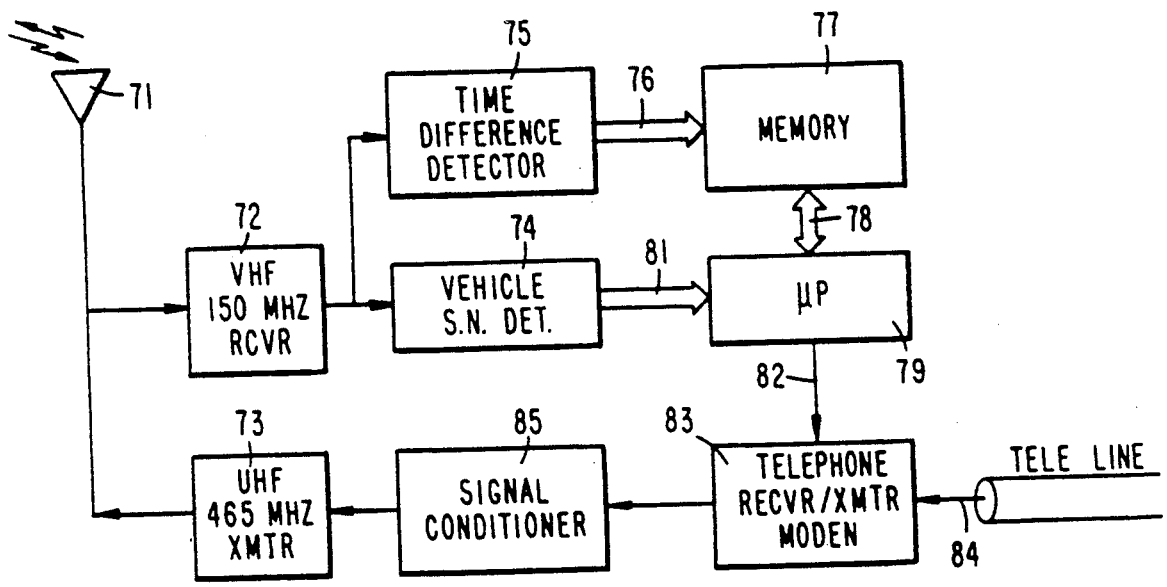
FIG. 3 is a block diagram of a preferred embodiment of a local master station included in the system of FIG. 1.

Reference is now made to FIG. 3 of the drawing, a block diagram of a preferred embodiment of apparatus included at local master station 21. Station 21 includes UHF-VHF antenna 71, to which are connected VHF receiver 72 and UHF transmitter 73, respectively designed to receive the 150 mHz VHF signal from vehicle 11 and to transmit the 465 mHz UHF signal received by receiver 36. Transmission between antenna 71 and antenna 31 can be either direct or via repeaters 22 or 23.

Receiver 72 derives a base band signal that is a replica of the signal supplied to transmitter 44. As such, receiver 72 derives pulses that correspond with the vehicle serial number binary signals; these pulses are supplied to vehicle serial number detector 74. In addition, receiver 72 derives pulses having occurrence times synchronized and corresponding with the reception times of the Loran-C pulses derived from low frequency amplifier and detector 52, FIG. 2. The output pulses of receiver 72 corresponding with the time separation of Loran-C pulses received at vehicle 11 is applied to time difference detector 75 which supplies a multi-bit digital signal to bus 76. The digital signal on bus 76, representing the time separations of the Loran-C pulses received by the low frequency receiver on vehicle 11, is supplied to longitude/latitude computer 77. Computer 77 has a memory in which are stored the longitude and latitude of Loran-C transmitting stations 12–13 in closest proximity to the local master station of which computer 77 is a part. Computer 77 derives multi-bit digital signals representing the longitude and latitude of vehicle 11 in response to the output of detector 75 and the signals stored therein.

The longitude and latitude representing output signals of computer 77 are supplied by bus 78 to microprocessor 79, including a memory responsive to the serial number representing output of detector 74. The serial number representing signal derived by detector 74 is supplied to microprocessor 79 on bus 81. Microprocessor 79 responds to the signals supplied to it on buses 78 and 81 and to a program stored therein to derive a sequence of binary signals on lead 82. The signals on lead 82 represent the vehicle serial number and the longitude and latitude thereof.

The signals on lead 82 are supplied to telephone receiver/transmitter circuit 83, typically in the form of a modem. The modem derives an output that is supplied to telephone line 84 that is connected to central master station 24. Alternatively, a satellite link can be provided between the output of microprocessor 79 and central master station 24.

Modem 83 is also responsive to voice and bi-level data signals derived by central master station 24, as transmitted via telephone line 84. Modem 83 responds to the signal from central master station 24 or any other link that subsists between master stations 21 and 24 by coupling it to the input of UHF transmitter 73 via signal conditioning network 85.

Figure 4:
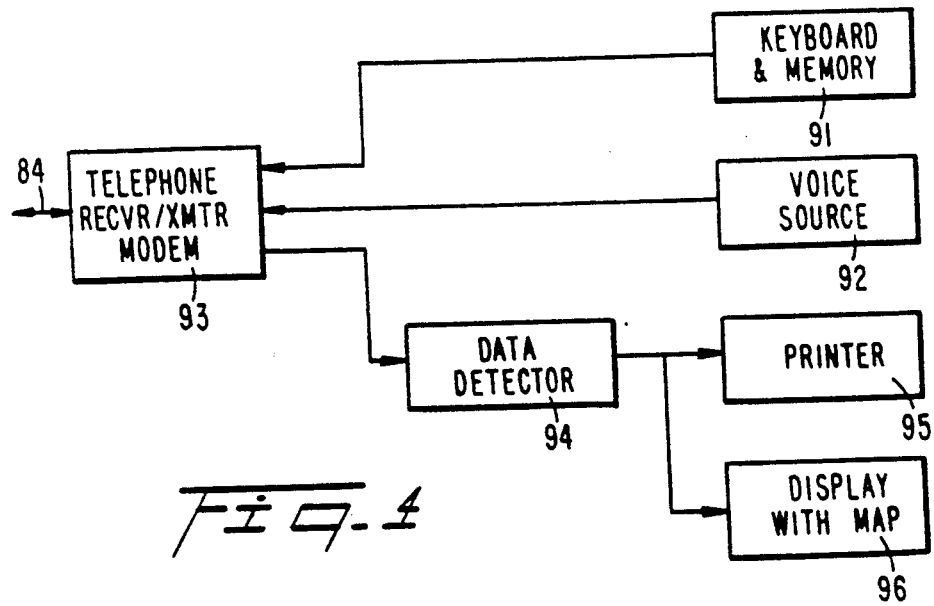
FIG. 4 is a block diagram of a preferred embodiment of the central master station included in the system of FIG. 1.

Reference is now made to FIG. 4 of the drawing, a block diagram of central master station 24. Central master station 24 includes a keyboard and memory 91 for deriving a multi-bit, bi-level signal. Typically, the signal derived by keyboard and memory 91 represents the serial number of a vehicle being called. In addition, an operating command for a function of the vehicle can be triggered by activation of the keyboard. For example, a command can be instigated to cause the headlamps or horn of the vehicle to be repeatedly and sequentially activated, to call to the attention of a law enforcement officer that the vehicle is being used by an unauthorized user. Such a signal, after being transmitted from station 24 to vehicle 11, is decoded by signal processing circuit 39 and used to activate switch 60 and/or 64 into on and off conditions.

Central master station 24 also includes voice source 92, which can either be a microphone responsive to a human voice, or a synthesizer responsive to an indication that the vehicle is being used by an unauthorized person. The voice source selectively derives a signal which is converted to an aural signal by speaker 42, e.g., advising an unauthorized user that he is driving a stolen vehicle, that his whereabouts are known and that they have been reported to local authorities.

Keyboard and memory 91 and voice source 92 are connected to an input of telephone receiver/transmitter or modem 93 that converts the data signal from circuit 91 into a dual tone signal having a frequency dependent on the binary value of the data signal. Keyboard and memory 91 and voice source 92 are activated so that the signal from the voice source is derived after the vehicle serial number signal is generated by circuit 91 and supplied to circuit 93. When voice source 92 is employed, the vehicle serial number code is followed by a multi-bit signal which is decoded by signal processing circuit 39 to command activation of switch 41 for a predetermined time interval, commensurate with the duration of the signal from voice source 92.

Central master station 24 also includes data detector 94 responsive to an output signal of circuit 93. Data detector 94 detects the vehicle serial number and the calculated longitude and latitude signals supplied by microprocessor 79 to modem 83, FIG. 3. Data detector 94 supplies the output signal thereof in parallel to printer 95 and to map display 96. Printer 95 responds to the signal from detector 94 to indicate the location and serial number of the vehicle which caused the transmission to occur. An operator responds to the output of printer 95 to activate keyboard 91 and voice source 92. Alternatively, keyboard 91 and voice source 92 respond directly to the output signal of data detector 94 via an automatic link including a microprocessor.

Map display 96 is preferably in the form of a video display initially having a coarse indication of the vehicle location. At the operator's option, maps with greater resolution indicating the position of the vehicle are provided on the display. Superimposed on the map is a blinking display with the vehicle serial number thereon.

It is not necessary for there to be an interactive relationship between the output of data detector 94, printer 95, keyboard 91 and voice source 92. If the device is used, for example, to locate vehicles in a rented fleet, the loaner may wish to determine the location of a particular vehicle in the fleet. In such an instance, an indication of the vehicle serial number is entered into keyboard 91. The vehicle having the entered serial number responds to the signal coupled to it via the UHF link. In response to such a signal, the vehicle initiates a transmission including its serial number and replicas of the Loran-C pulses supplied to it.

Figure 5:
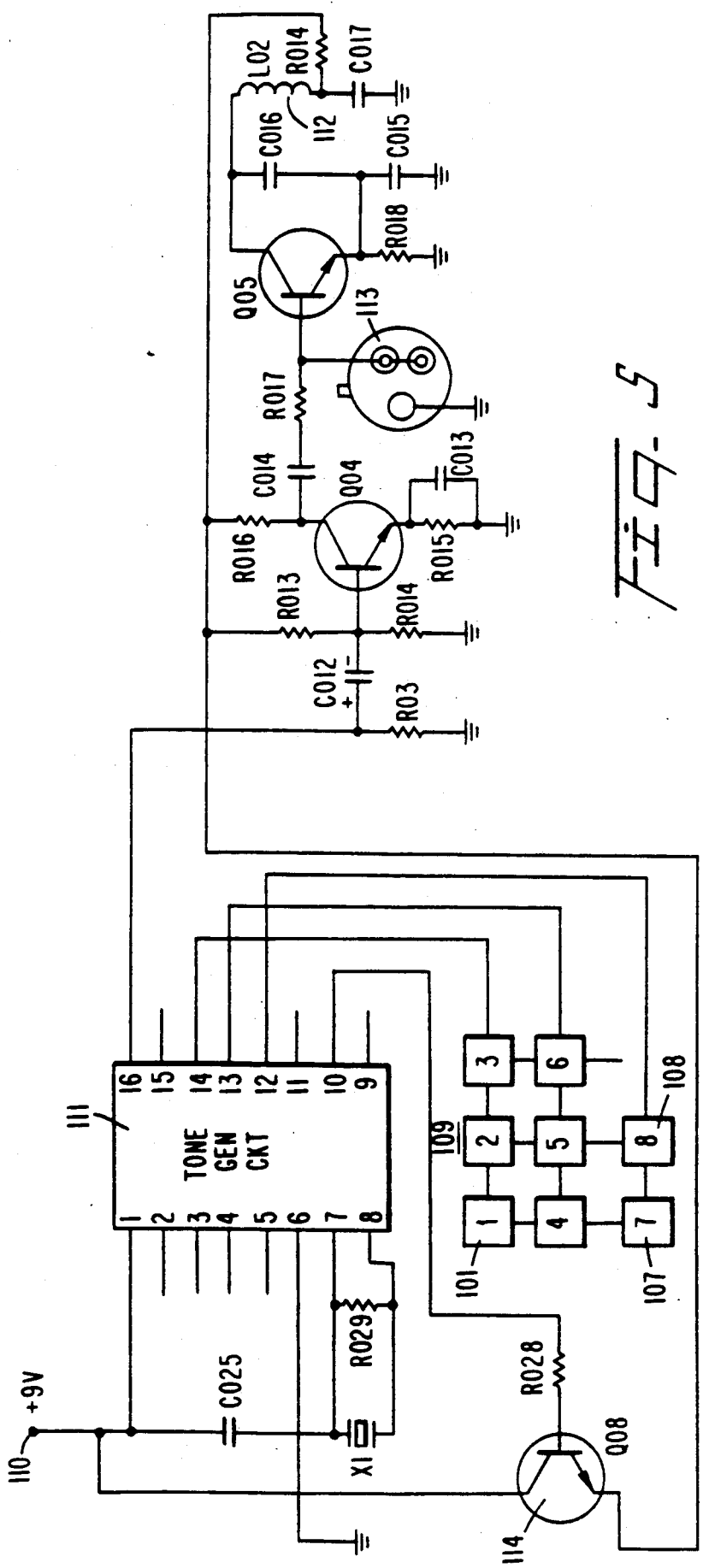
FIG. 5 is a schematic diagram of a key pad transmitter included in the system of FIG. 1.

Reference is now made to FIG. 5 of the drawing, a schematic diagram of the apparatus included in key pad 25, FIG. 1. The key pad of FIG. 5 derives a fixed carrier, at a frequency of 303 megaHertz. The carrier is an inductive wave modulated by a pair of tones, the frequencies of which are determined by which of keys 101-108 of keyboard 109 is activated. The tone frequencies are the same as the frequencies derived from a telephone handset in response to activation of keys 1-8 of the handset.

The keys of keyboard 109 are connected to three inputs of tone generator integrated circuit 111, having a power supply terminal connected to positive battery terminal 112 In response to one of keys 101-108 being activated, tone generator 111 derives a signal that forward biases transistor Q8, causing the tone generator to derive the 303 megahertz output in response to excitation by crystal X1. The 303 megaHertz carrier derived by generator 111 is modulated by a pair of frequencies, the values of which are determined by the binary levels on the leads connected to keys 101-108.

The output of tone generator 111 is supplied to an RF transmitter including cascaded transistors Q4 and Q5, between which is connected a surface acoustic wave (SAW) bandpass filter 113 having a center frequency at 303 megaHertz. The resulting 303 megaHertz dual tone modulated signal derived at the collector of transistor Q5 is supplied to coil 112. The coil thus derives an inductive wave at a frequency of 303 megaHertz with the dual tone modulation superposed thereon.

Figure 6A:
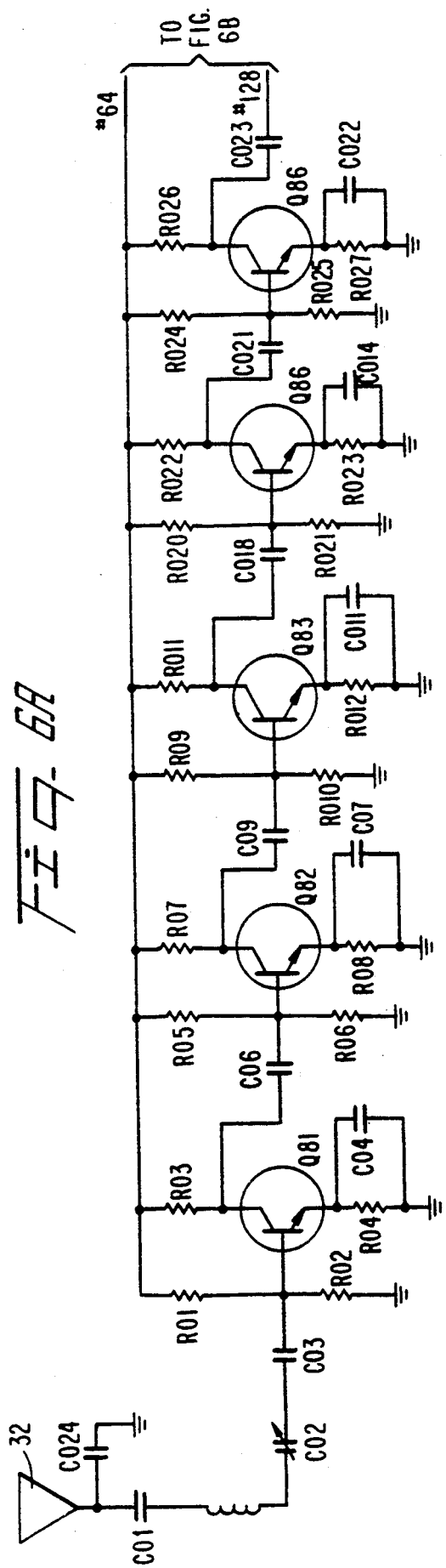
FIG. 6 including Sheets 6A-6I comprises a detailed circuit diagram of the apparatus illustrated in FIG. 2.
Figure 6:
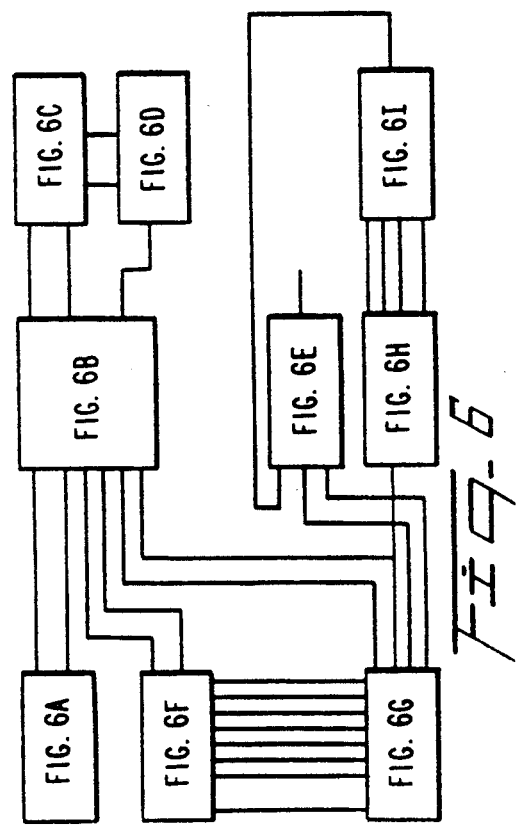
Figure 6F:
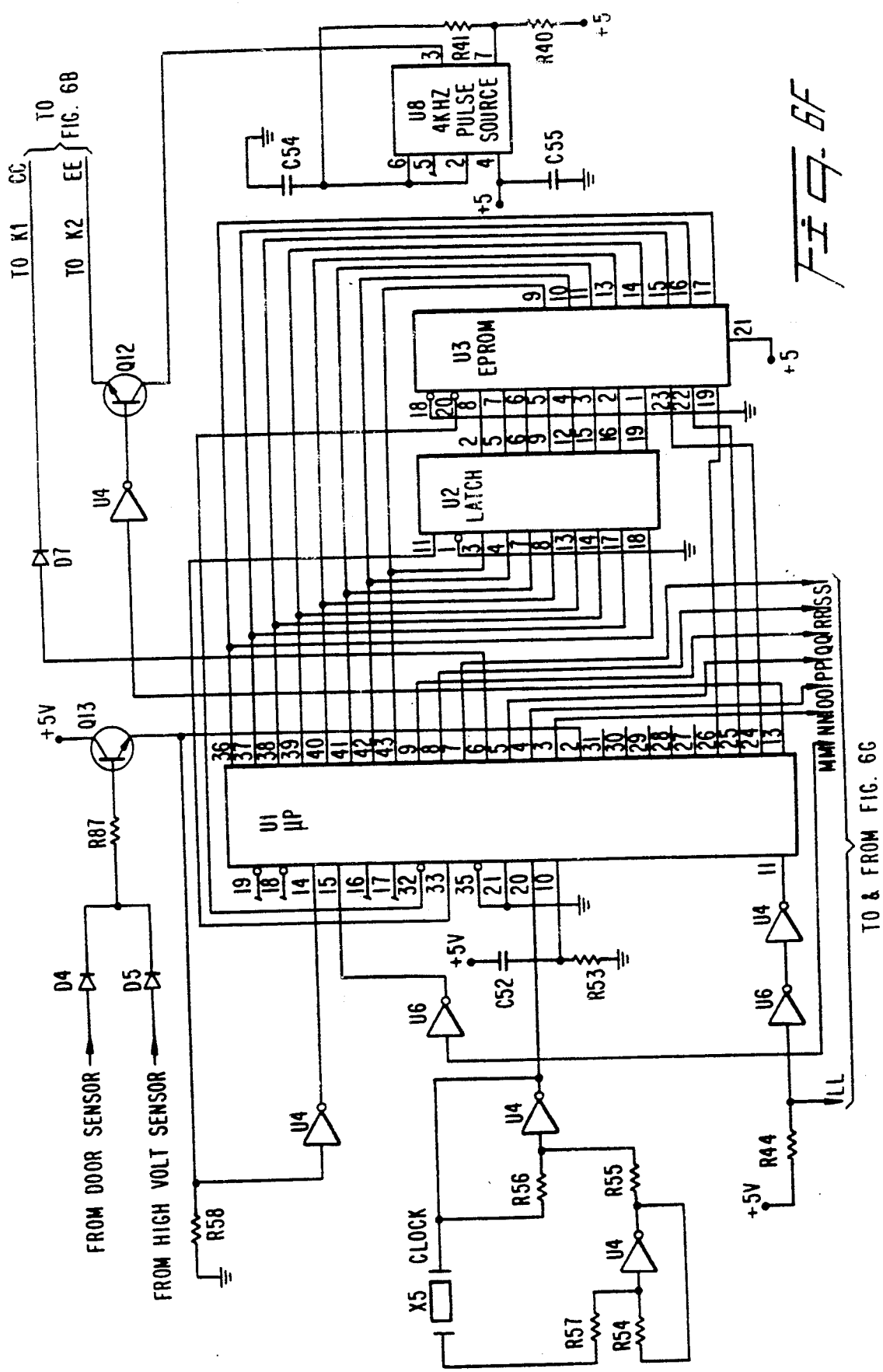
Figure 6H:
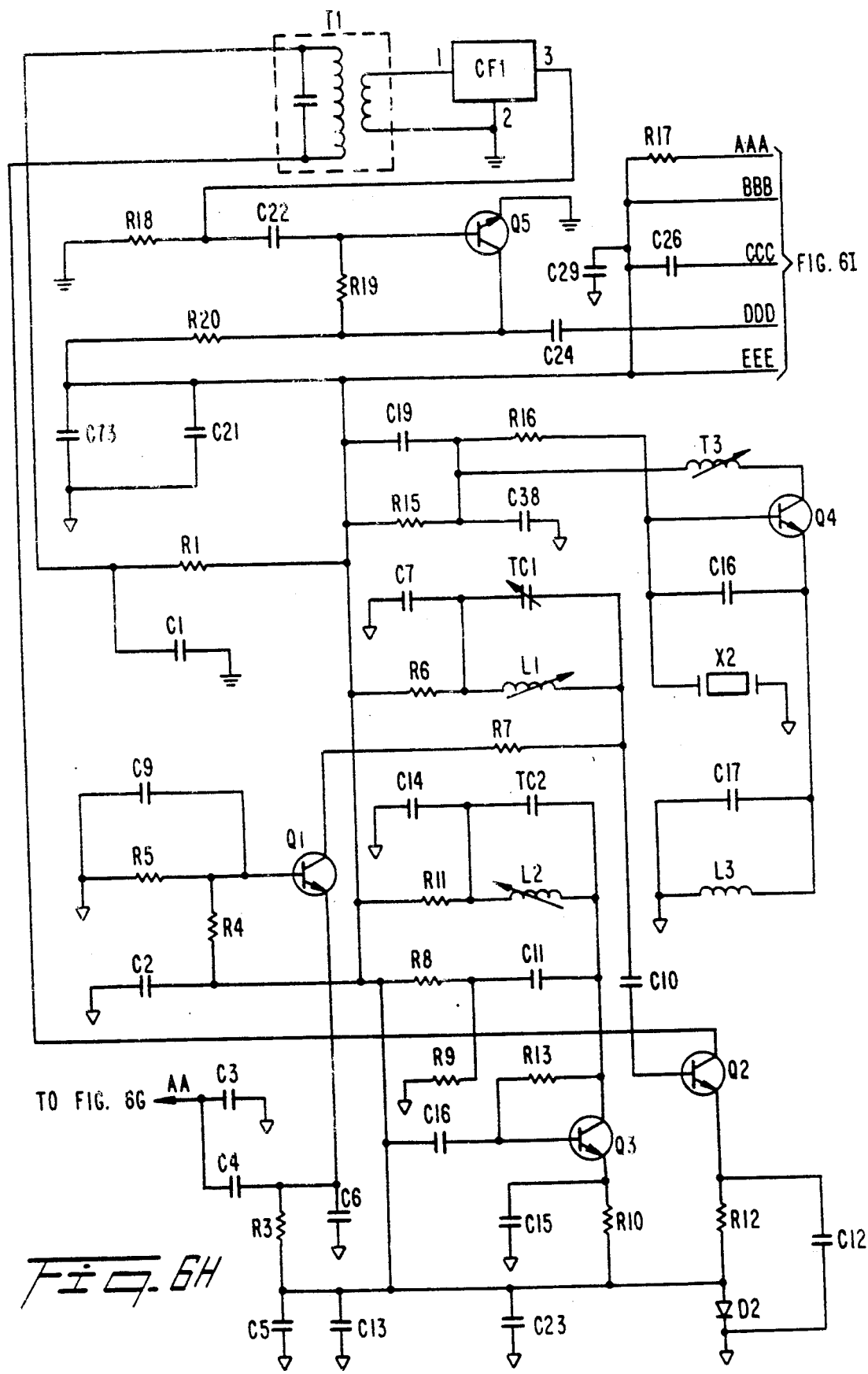
Figure 6I:
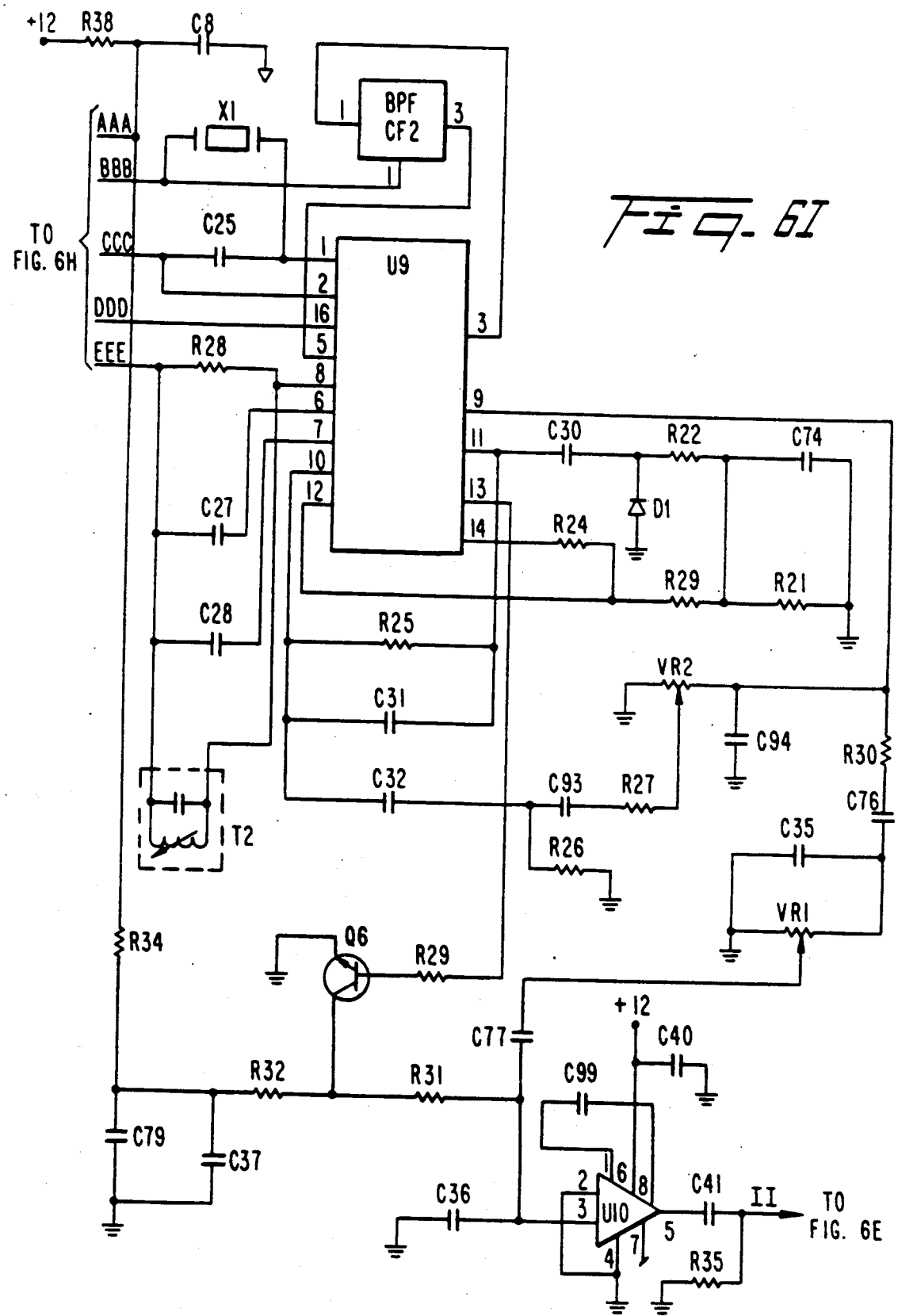

Reference is now made to FIG. 6 of the drawing, a detailed circuit diagram of the apparatus illustrated in block diagram form in FIG. 2. FIG. 6 includes several sheets, FIGS. 6A-6I, having components connected together by terminals AA-II, such that terminals of like nomenclature are connected, e.g., terminals AA and AA on FIG. 6B and 6C are connected.

Low frequency amplifier and detector 52, responsive to the low frequency, Loran-C signal transduced by antenna 32, includes a bandpass filter comprising inductor L1 and capacitors C1, C2 and C24, connected between the antenna and an input of a preamplifier including R-C coupled stages of a high gain preamplifier including common emitter transistors Q81-Q83, Q86 and Q87. The output of the high gain preamplifier, at the collector of transistor Q87, is supplied to an amplifier including cascaded common emitter transistors stages Q14-Q16 via a bandpass filter including inductor L9, capacitors C81, C82 and C145. The output of the amplifier is derived at the collector of transistor Q16 and supplied via capacitor C90 to a detector including diode D6 and capacitor C92, shunted by resistor R74. Power is selectively applied to the emitter collector paths of transistors Q14-Q16 by contacts of relay K2, which are equivalent to the contacts of switch 54, FIG. 2. Pulses derived by the detector including diode D6 are synchronized with and have occurrence times corresponding with the Loran-C pulses received and transduced by antenna 32.

Pulses developed by the detector including diode D6 are coupled by a network including resistors R71 and R72, in combination with capacitor C96 and contacts of relay K1 to the input of VHF transmitter 44. The contacts of relay K1 correspond with contacts 56, FIG. 2.

VHF transmitter 44 includes MC2833 exciter integrated circuit U17 having an input responsive to data sources and replicas of the Loran-C pulses. The input to circuit U17 is via a network including resistor R49 and capacitor C58. The transmitter exciter circuit derives an output signal having a frequency of 150 mHz. Modulated on the 150 mHz output of the exciter circuit are data pulses and replicas of the Loran-C pulses, depending on the activation state of relay K1.

The 150 mHz modulated output wave of the exciter circuit is applied to an input terminal of a relatively high power tuned transmitter amplifier including cascaded transistors Q17-Q19. The amplifier including transistors Q17-Q19 includes series and shunt inductors and capacitors, as well as ferrite beads FB2, FB3 and FB4.

Power is selectively applied to the emitter-collector paths of transistors Q17-Q19 via contacts of relay K1 corresponding with the contacts of switch 49, FIG. 2. The output signal of the transmitter amplifier, at the collector of transistor Q19, is selectively coupled to antenna 31 by contacts of relay K1, corresponding with switch contacts 45, FIG. 2.

The signal received and transduced by antenna 31 is coupled in parallel to receivers 36 and 37 via the contacts of relay K1 corresponding with contacts 35, FIG. 2. UHF receiver 36 includes transistors Q1-Q4, basically configured as a tuned amplifier having a center frequency of 465 mHz, a mixer, an i.f. filter, and a demodulator. The 465 mHz signal is applied by a coupling network including capacitors C3 and C4 to the emitter of common base transistor Q1. The signal at the collector of transistor Q1 is supplied to the base of transistor Q2, connected in the common emitter mode, so that the amplified output signal of transistor Q2 is supplied via a network including transformer T1 and ceramic filter CF1 to the base of transistor Q5, having a collector coupled to MC3361 demodulator integrated circuit U9. To provide the necessary frequency translation, an oscillator including transistor Q4 and a mixer including transistors Q2 and Q3 is provided. Receiver 36 derives, at pin 9 of integrated circuit U9, a demodulated, base band signal that is a replica of the signal derived at master station 21. The base band signal is supplied via a network including resistor R30, capacitors C35 and C76, and potentiometer VR1 to the contacts of relay K3, which contacts correspond with switches 38 and 41, FIG. 2.

The output signal of UHF-VHF antenna 31 is also coupled to key pad receiver 37, including a super regenerative receiver having a tuned bandpass filter with a center frequency of 303 mHz. The super regenerative receiver includes transistor Q20. The output of the super regenerative receiver, including base band audio frequency tones having the same frequencies as the frequencies derived from the key pad transmitters 25 is coupled via a network including resistor R76 and capacitor C134 to analog input pin 9 of SSI202 integrated circuit U7, a dual tone telephone receiver circuit.

Signal processing circuit 39 includes IN8031 microprocessor chip U1, 74LS373 latch integrated circuit U2, ET2716 integrated circuit EPROM (electronically programmable read-only memory) U3, LS138 three to eight decoder integrated circuit chip U5, SSI208 dual tone telephone receiver integrated circuit chip U7, ALM 555 integrated circuit U8, configured as a 4 kHz pulse source, IN567 data decoder integrated chip U14, ·LM555 integrated circuit U16, configured as a 250 Hertz pulse source, and transistor switch 212. Switch 212 responds to data signals derived by signal processing circuit 39 to modulate them with the 4 kHz output of oscillator U8. Signal processing circuit 39 is driven by a conventional clock source including 8 mHz crystal X5.

Microprocessor U1 is selectively activated to one of two states. The "normal" operating state of microprocessor U1 is interrupted by a signal being derived by either door sensor 33 or high voltage coil sensor 34. Sensors 33 and 34 derive output signals that are coupled via an OR gate including diodes D4 and D5 to microprocessor U1 via the normally backed bias emitter collector path of transistor Q13. The output of transistor Q13 is directly applied to pin 2 of microprocessor U1 and to pin 14 of the microprocessor via an inverting amplifier.

Pin 15 of microprocessor U1 responds to an output signal of dual tone telephone receiver integrated circuit U7 on pin 14. The signal on pin 14 of circuit U7 indicates that an analog tone signal is being supplied to integrated circuit U7 on pin 9 by the output of super regenerative receiver including transistor Q20. The output of circuit U7 at pin 14 controls microprocessor U1 so that circuit U1 is selectively in the normal and interrupt states.

Simultaneously with circuit U7 activating microprocessor U1 into a state indicative of the super regenerative receiver including transistor Q20 deriving a signal, circuit U7 derives a three bit binary signal on pins 1, 17 and 18. The three bit binary signal on pins 1, 17 and 18 indicates which one of the eight keys on the keyboard of key pad 25 is activated. The three bit, numeric indicating signal at pins 1, 17 and 18 of circuit U7 is supplied to pins 3–5 of microprocessor U1.

Microprocessor U1 responds to the numeric indicating signals supplied to pins 3–5 by comparing the levels thereof with multiple numeric indicating prestored values for the vehicle in which the equipment is located. The prestored value is stored in EPROM U3. The multiple numeric indicating three bit signals are supplied by the three least significant bit pins 9–11 of EPROM U3 to pins 41–43 of microprocessor U1 in response to the EPROM being addressed by the microprocessor. EPROM U3 is addressed for this purpose by supplying pins 22, 23 and 19 of the EPROM with a signal in response to signals derived at pins 24–26 of microprocessor U1.

Microprocessor U1 is programmed to compare the numerical indicating three bit signals supplied to it by EPROM U3 with the signals supplied to it by the output of circuit U7 (indicative of the numeric values of the keys of keypad 25 which have been activated). In response to the comparison revealing an equality between the sequential numeric values of the keys of pad 25 and the numeric value assigned to the vehicle while normal operation of microprocessor U1 is interrupted by the signal supplied by transistor Q13 to pin 2 of the microprocessor, no change in state of relays K1 and K2 occurs, as described supra. If, however, microprocessor U1 does not detect an equality between the output of EPROM U3 and the sequential output signal on pins 1, 17 and 18 of circuit U7 within 30 seconds of a binary one signal being supplied to pin 2 by transistor Q13, the microprocessor derives signals which cause the states of relays K1 and K2 to change in the manner described supra. In particular, microprocessor U1 supplies, via pin 6 thereof, a signal which is coupled through diode D7 to the base of transistor Q10. Transistor Q10 thereby becomes forward biased to supply current to the coil of relay K1, so that the relay functions as described supra.

The coils of relays K2 and K3 are selectively supplied with current in response to signals derived by microprocessor U1 on its pins 6–8. The binary levels on pins 6–8 of microprocessor U1 are supplied to data input pins 1–3 of integrated circuit U5, configured as a three to eight decoder. Pins 11 and 14 of decoder integrated circuit U5 are coupled via inverters of hex integrated circuit U6 to the coils of relays K3 and K2 via transistors Q9 and Q11, respectively. In response to the data signal applied to pins 1-3 of decoder circuit U5 having first and second combinations, coils K2 and K3 are activated at mutually exclusive times from the normal, illustrated state thereof, to the other state thereof In response to a further combination of signals supplied to pins 1-3 of decoder circuit U5, a pulse is supplied by pin 13 of circuit U5 to buzzer 58 via an inverter of circuit U6.

The coded signal derived from central master station 24, after being demodulated, is normally supplied by the normally closed contacts of relay K3 to pin 3 of data decoder U14. The coded signal is transmitted from station 24 as pulsed tones having different frequency to represent binary zero and one levels.

These tones are converted into binary zero and one levels by circuit U14 which derives on output pin 8 thereof a bilevel output having a value commensurate with the code of alpha-numeric characters supplied to keyboard 91. The binary level at pin 8 of circuit U14 is supplied via inverters of hex inverting amplifiers U6 and U4 to pin 11 of microprocessor U1.

Initially, microprocessor U1 responds to the signal supplied to pin 11 thereof by addressing EPROM U3 to the address commensurate with the serial number of the vehicle receiver containing the circuitry. To these ends, microprocessor U1 derives on its pins 36–43 binary levels commensurate with the address of EPROM U3 where the serial number for the vehicle is stored. This signal is supplied to address pins 1–8 of EPROM U3 via latch U2. To this end, (1) pins 36–43 of microprocessor U1 are connected to pins 3, 4, 7, 8, 13, 14, 17 and 18 of latch integrated circuit U2, (2) output pins 2, 5, 6, 9, 12, 15, 16 and 19 of latch U2 are connected to pins 8–1 of the EPROM, (3) enable pin 11 of the latch is connected to pin 33 of the microprocessor, and (4) pin 20 of the EPROM is connected to pin 32 of the microprocessor. Latch U2 and EPROM U3 are respectively enabled at mutually exclusive times in response to the signals supplied to pins 11 and 20 thereof so that no signal is supplied to the latch while an output signal is derived from the EPROM. Also, no signal is supplied by microprocessor U1 to pins 36–43 thereof while a signal is derived from pins 9–17 of EPROM U3. This enables pins 9–17 of EPROM U3 to supply binary levels to pins 43–36, respectively, of microprocessor U1.

In response to the serial number signal supplied to pin 11 of microprocessor U1 being the same as the serial number stored in EPROM U3, the microprocessor supplies the vehicle serial number which has just been supplied to it by EPROM U3 to pin 13 of the microprocessor. Pin 13 is also responsive to the coded serial number digital signal in response to an indication of security breach, as detected in response to the signal supplied to pins 3–5 being the same as the signal read out from EPROM U3 in response to activation of pins 19, 22 and 23 of the EPROM. The signal derived on pin 13 is a 300 baud signal having binary levels commensurate with the coded vehicle serial number data. The 300 baud signal at pin 13 of microprocessor U1 is supplied via an inverter of hex inverter network U4 to the base of transistor Q12. The collector of transistor Q12 is connected to output pin 13 of 4 kHz pulse source circuit U8. Thereby, at the emitter of transistor Q12 is derived a 300 baud signal on which are superimposed 4 kHz pulses from circuit U8. The signal at the emitter of transistor Q12 is selectively coupled to VHF transmitter 44 via contacts of relay K2.

The signals at pins 7, 9 and 12 of decoder circuit U5 are respectively coupled to switches 39, 60 and 64 which control the ignition, horn and headlights of the automotive vehicle on which the equipment is included. Pulses supplied by data decoder circuit U4 to pin 11 of microprocessor U1 after detection of the vehicle serial number pulses transmitted from central station 24 control the signals at microprocessor pins 7–9 such that binary one signals are selectively supplied to pins 12, 9 or 7 to control these automotive functions. In addition, a coded signal supplied to pin 11 of microprocessor U1 after detection of the vehicle serial number code causes a binary one signal to be derived by decoder U5 at pin 11. This signal causes the state of relay K3 to change, so that the audio amplifier in integrated circuit U11 is connected to the voice output of the UHF receiver. The output of the audio amplifier of circuit U11 supplies the speaker in the automotive vehicle with an aural message, as described supra.

While there has been described and illustrated one specific embodiment of the invention, it will be clear that variations in the details of the embodiment specifically illustrated and described may be made without departing from the true spirit and scope of the invention as defined in the appended claims.

I claim:

1. A method of locating a vehicle equipped with a receiver for low frequency radio waves in response to first pulses of said low frequency radio wave transmitted to the vehicle from three stations having known locations, the first pulses being transmitted from the stations at precise time intervals so that the pulses from the different stations arrive at the vehicle at displaced times, the method comprising receiving the first pulses of the low frequency radio waves at the receiver on the vehicle, transmitting from the vehicle a radio frequency wave modulated by second pulses having displaced time positions synchronized and corresponding with the reception times of the first pulses as received by the receiver, receiving the radio frequency wave at a location displaced from the vehicle, detecting the displaced time positions of the second pulses in response to the radio frequency wave received at the location displaced from the vehicle, and determining the location of the vehicle from the detected displaced time positions.

2. The method of claim 1 wherein the method is performed for a fleet of vehicles each including one of the receivers, each of said receivers having a different serial number digital code assigned to it, further comprising establishing a communication link between a master station and each of the receivers, then selecting one of the receivers by transmitting the serial number code associated with said one receiver via said link, and then transmitting the radio frequency wave from the selected receiver to the master station via the link.

3. The method of claim 2 wherein the master station detects the displaced time positions and determines the location of the vehicle in response to the displaced time positions.

4. The method of claim 3 wherein a plurality of said master stations are provided at displaced locations and a central station is provided, the method further comprising establishing a communication link between the central station and the master stations, and transmitting via the communication link the serial number digital code from the central station to the master stations and the determined vehicle location from the master station to the central station.

5. The method of claim 4 wherein the vehicle transmits to the master station the vehicle serial number with the second pulses, and the master station transmits the vehicle serial number to the central station with the determined vehicle location.

6. The method of claim 3 wherein the vehicle transmits the vehicle serial number with the second pulses to the master station.

7. The method of claim 2 wherein the vehicle transmits the vehicle serial number with the second pulses to the master station, and the master station transmits the vehicle serial number and the determined vehicle location to the central station.

8. The method of claim 1 wherein the receiver includes a section responsive to another wave radiated from a source carried by a vehicle operator, and further comprising radiating from the source another wave having a pre-assigned code modulated thereon, receiving the another wave having the pre-assigned code modulated thereon at the receiver section, in response to the code of the received another wave being the same as a predetermined digital code at the receiver activating the receiver into a first state for a predetermined time interval, the receiver being in a second state at all other times, and preventing transmission of the radio frequency wave during the predetermined time interval.

9. The method of claim 8 further including detecting a condition of the vehicle, and controlling transmission of the radio frequency wave from the vehicle in response to the detected vehicle condition and the code of the received another wave.

10. Apparatus adapted to be mounted on a vehicle for (a) responding to (i) first radio waves having a low frequency modulated by first pulses, the first radio waves being derived by at least three sources at known different locations, (ii) a signal indicating a sensed condition of the vehicle, and (iii) another wave having a predetermined code, and (b) transmitting a second radio wave to a remote receiver, the apparatus comprising means responsive to the another wave having the predetermined code for deriving a disabling signal, a receiver for the pulse modulated low frequency radio waves, means responsive to the receiver for deriving a second radio wave modulated by second pulses having displaced time positions synchronized and corresponding with the reception times of the first pulses as received by said receiver, and means responsive to the sensed condition signal and the disabling signal deriving means for selectively transmitting the second radio wave to the remote receiver.

11. The apparatus of claim 10 wherein the apparatus is responsive to a third radio wave having a preset code, said means for selectively transmitting enabling transmission of the second radio wave to the remote receiver in response to the third radio wave having the preset code being received at the vehicle.

12. The apparatus of claim 11 wherein the another wave is a radio wave, a common antenna for the second, third and another waves, separate receivers for the first, third and another waves, a transmitter for the second wave, the means for selectively transmitting including switch means connected between said common antenna and said separate receivers for the third and another waves and said transmitter for the second wave, and another antenna for the first wave connected to the receiver for the first wave.

13. The apparatus of claim 11 wherein the apparatus includes means for deriving a digital signal indicative of a serial number, the transmitting means being responsive to the serial number signal deriving means for modulating the second wave in response to the serial number digital signal.

14. A system for determining the location of a vehicle at a location remote from the vehicle, said vehicle being assigned a serial number, said system being responsive to Loran-C emissions from at least three Loran-C transmitters, said system comprising a central master station, plural local networks, each of said local networks including a local master station in a bi-directional communication link with the central master station, each of said vehicles including: means for receiving the Loran-C emissions, the means for receiving the Loran-C emissions deriving pulses having time positions corresponding with and synchronized with Loran-C pulses as received by the means for receiving, a transmitter responsive to the means for receiving for modulating a first carrier having a frequency much higher than the Loran-C emissions with further pulses having time positions corresponding with and synchronized with Loran-C pulses as received by the means for receiving, and a receiver for a second carrier having a frequency much higher than the Loran-C emissions; the first and second carriers being transmitted via radio links to the local master station in proximity to the vehicle; the local master station including: means responsive to the first carrier for detecting the time difference between sets of the further pulses modulating the first carrier, means responsive to the time difference detecting means for determining the vehicle position, and means responsive to the vehicle position determining means and the first carrier for transmitting a data signal to the central master station indicative of the determined vehicle position and the vehicle serial number; the central master station including: means responsive to the data signal for indicating the vehicle location and serial number, means for transmitting an information signal including the serial number for one of the vehicles to said master local stations, each of said local master stations including a receiver for the information signal and means for modulating the second carrier with the information signal; the receiver of one of the vehicles including means for detecting the information signal assigned to said one vehicle.

15. The system of claim 14 wherein the central master station includes means for deriving a voice signal, the information signal including the derived voice signal, the vehicle including means for detecting the voice signal and for deriving an aural replica thereof.

16. The system of claim 14 wherein the vehicle includes: receiver means for a locally generated coded signal for identifying the vehicle, sensor means for detecting vehicle condition, and means responsive to the receiver means for the locally generated coded signal and the vehicle condition sensor means for controlling activation of the transmitter on the vehicle.

17. The system of claim 16 wherein the sensor means includes first and second sensors for respectively detecting open door and engine operating conditions of the vehicle, responses from the first and second sensors being combined with a response of the receiver means for the locally generated coded signal to control activation of the transmitter on the vehicle.

18. The system of claim 17 wherein the vehicle includes an ignition controller, responses from the first and second sensors being combined with a response of the receiver means for the locally generated coded signal to control activation of the ignition controller.

19. The system of claim 16 wherein the vehicle includes a vehicle function controller, the central master station including means for transmitting a data signal for control of the vehicle function controller, the information signal including the data signal for control of the vehicle function controller, the vehicle including means for controlling the vehicle function controller in response to the data signal as received by the vehicle receiver for the second carrier, the sensor and the receiver for the locally generated coded signal.

20. The system of claim 14 wherein the vehicle includes a vehicle function controller, the central master station including means for transmitting a data signal for control of the vehicle function controller, the information signal including the data signal for control of the vehicle function controller, the vehicle including means for controlling the vehicle function controller in response to the data signal as received by the vehicle receiver for the second carrier and the receiver for the locally generated coded signal.

21. The system of claim 14 further including relay station means coupled with the local master stations, and wherein each relay station means includes means for relaying the first and second carriers between the local master station coupled with the relay station means, the first and second carriers being coupled between the vehicle and the means for relaying via the radio links.

22. A security system for a vehicle comprising a code generator for emitting a first wave coded for the vehicle, the vehicle including: sensor means for a condition of the vehicle, a receiver for the first wave, a low frequency receiver for Loran-C emissions, a transmitter for radio frequency waves, and means responsive to the receiver for the first wave, the low frequency receiver and the sensor means for controlling activation of the radio frequency transmitter so that replicas of Loran-C pulses received by the low frequency receiver selectively modulate the radio frequency waves transmitted by the radio frequency wave transmitter.

23. The security system of claim 22 wherein the vehicle further includes a receiver for a radio frequency wave having a vehicle serial number code modulated thereon, and means responsive to the radio frequency wave receiver for detecting the serial number code and for controlling activation of the radio frequency transmitter so that replicas of Loran-C pulses received by the low frequency receiver selectively modulate the radio frequency waves transmitted by the radio frequency wave transmitter.

24. The security system of claim 23 wherein the vehicle further includes: means for modulating the radio frequency waves transmitted by the radio frequency wave transmitter with a vehicle serial number each time the replicas of Loran-C pulses modulate the radio frequency waves.

25. The security system of claim 22 wherein the vehicle further includes means for modulating the radio frequency waves transmitted by the radio frequency wave transmitter with a vehicle serial number each time the replicas of Loran-C pulses modulate the radio frequency waves.

26. The security system of claim 22 wherein the sensor means includes means for sensing whether a door of the vehicle is open.

27. The security system of claim 22 wherein the sensor means includes means for sensing whether an engine of the vehicle is operating.

28. The security system of claim 27 wherein the sensor means includes means for sensing whether a door of the vehicle is open, responses from both of the means for sensing being combined to control the activation of the radio frequency transmitter.

29. A local master station comprising a receiver for a radio wave modulated with a coded signal indicative of a serial number of a vehicle and with replicas of Loran-C pulses as received by the vehicle, means responsive to the replicas of the Loran-C pulses for calculating the location of the vehicle, and means responsive to the coded signal and the means for calculating for transmitting to a central station a wave including the coded signal indicative of the vehicle serial number and a signal indicative of the calculated vehicle location.

30. The local master station of claim 29 further including means responsive to a transmission from the central station indicative of a vehicle serial number, and means for transmitting a radio wave modulated by the vehicle serial number.

31. The local master station of claim 29 further including means responsive to a transmission from the central station indicative of a vehicle serial number and including a voice message, and means for transmitting a radio wave modulated by the vehicle serial number and the voice message.

32. Apparatus adapted to be mounted on a vehicle to (a) be responsive to (i) first radio waves having a low frequency modulated by first pulses, the first radio waves being derived by at least three sources at known different locations, and (ii) another wave having a predetermined code, and (b) transmit a second radio wave to a remote receiver, the apparatus comprising, a first receiver for the pulse modulated low frequency first radio waves, a second receiver for the another wave, and means responsive to the first and second receivers for deriving the second radio wave, the second radio wave being modulated by second pulses having displaced time positions synchronized and corresponding with the reception times of the first pulses as received by said first receiver and modulated by a digital indication of a serial number for the vehicle.

33. The apparatus of claim 32 wherein the another wave is a third radio wave including first and second components, the first component being modulated by a first signal representing data for commanding functions of the vehicle, the second component being modulated by a second signal representing vehicle serial number, first means for detecting the first signal, second means for detecting the second signal, and means for controlling a function of the vehicle in response to the signals detected by the first and second detecting means.

34. The apparatus of claim 33 wherein the second receiver is responsive to a fourth radio wave having a frequency displaced from the third wave, the fourth wave being modulated by a dual frequency audio signal representing another code identification for the vehicle, the apparatus further comprising third means for detecting the modulation of the fourth wave, and means for controlling the second radio wave deriving means in response to the signals detected by the second and third means.

35. The apparatus of claim 34 further including a common antenna for the second, third and fourth waves, separate receivers for the first, third and fourth waves, a transmitter for the second wave, and switch means connected between said common antenna and said separate receivers for the third and fourth waves and said transmitter for the second wave, and another antenna for the first wave connected to the receiver for the first wave.

36. The apparatus of claim 32 wherein the another wave is a third radio wave modulated by a dual frequency audio signal representing a code identification for the vehicle, the apparatus further comprising means for detecting the modulation of the third wave, and means for controlling the second radio wave deriving means in response to the signal detected by the means for detecting the modulation of the third wave.

* * * * *